(12) United States Patent
Porat et al.

(10) Patent No.: US 11,827,541 B2
(45) Date of Patent: Nov. 28, 2023

(54) POLYMER FLOODING PRODUCED WATER TREATMENT

(71) Applicant: KEMIRA OYJ, Helsinki (FI)

(72) Inventors: Iris Porat, Mableton, GA (US); Miguel Pelaez, Decatur, GA (US); Mehrdad Hesampour, Espoo (FI); Yuping Luo, Johns Creek, GA (US); William Morris, Marietta, GA (US); Luciana Bava, Dunwoody, GA (US)

(73) Assignee: KEMIRA OYJ, Helsinki (FI)

(*) Notice: Subject to any disclaimer, the term of this patent is extended or adjusted under 35 U.S.C. 154(b) by 0 days.

(21) Appl. No.: 17/737,545

(22) Filed: May 5, 2022

(65) Prior Publication Data
US 2022/0332612 A1    Oct. 20, 2022

Related U.S. Application Data

(62) Division of application No. 16/489,828, filed as application No. PCT/US2018/021162 on Mar. 6, 2018, now Pat. No. 11,365,138.

(60) Provisional application No. 62/575,733, filed on Oct. 23, 2017, provisional application No. 62/467,513, filed on Mar. 6, 2017.

(51) Int. Cl.
| C02F 1/68 | (2023.01) |
| C02F 1/44 | (2023.01) |
| C02F 1/72 | (2023.01) |
| C02F 101/30 | (2006.01) |
| C02F 103/36 | (2006.01) |

(52) U.S. Cl.
CPC ........... *C02F 1/683* (2013.01); *C02F 1/44* (2013.01); *C02F 1/72* (2013.01); *C02F 2101/30* (2013.01); *C02F 2103/365* (2013.01); *C02F 2303/18* (2013.01)

(58) Field of Classification Search
CPC .... C02F 1/683; C02F 1/44; C02F 1/72; C02F 2101/30; C02F 2103/365; C02F 2303/18
See application file for complete search history.

(56) References Cited

U.S. PATENT DOCUMENTS

| 6,344,434 B1 | 2/2002 | Matsuo et al. |
| 7,220,509 B2 | 5/2007 | Merzougui et al. |
| 7,398,826 B2 | 7/2008 | Hoefer et al. |
| 7,506,689 B2 | 3/2009 | Surjaatmadja et al. |
| 8,410,226 B2 | 4/2013 | Hull, Jr. et al. |

(Continued)

FOREIGN PATENT DOCUMENTS

| CN | 105967306 | 9/2016 |
| WO | 2011/135313 | 11/2011 |

OTHER PUBLICATIONS

CN 105967306, machine translation. Jul. 28, 2021.

(Continued)

*Primary Examiner* — Benjamin L Lebron
(74) *Attorney, Agent, or Firm* — Robin Teskin; Baker, Donelson, Bearman, Caldwell & Berkowitz, PC

(57) ABSTRACT

The present embodiments generally relate to the treatment of produced water comprising one or more water soluble polymers, wherein such treatment comprises: adding to the produced water at least one iron complex; and degrading at least a portion of the one or more water soluble polymers. This treatment may result in a reduction of the viscosity of said produced water and/or the degradation of the water soluble polymers which are contained therein.

11 Claims, 12 Drawing Sheets

(56) References Cited

U.S. PATENT DOCUMENTS 20,130,213    8/2013   Dobson et al.
9,254,453 B2  2/2016   McDaniel et al.

OTHER PUBLICATIONS

Igunnu ET, Chen GZ. Produced water treatment technologies. International journal of low-carbon technologies. Sep. 1, 2014;9(3):157-77.

Lu M, Wei X. "Treatment of oilfield wastewater containing polymer by the batch activated sludge reactor combined with a zerovalent iron/EDTA/air system." Bioresour Technol. 2011;102(3):2555-2562. doi:10.1016/j.biortech.2010.11.103.

Manichand, R. N., Moe Soe Let, K. P., Gil, L., Quillien, B., & Seright, R. S. (Sep. 4, 2013). "Effective Propagation of HPAM Solutions Through the Tambaredjo Reservoir During a Polymer Flood," Society of Petroleum Engineers. doi:10.2118/164121-PA.

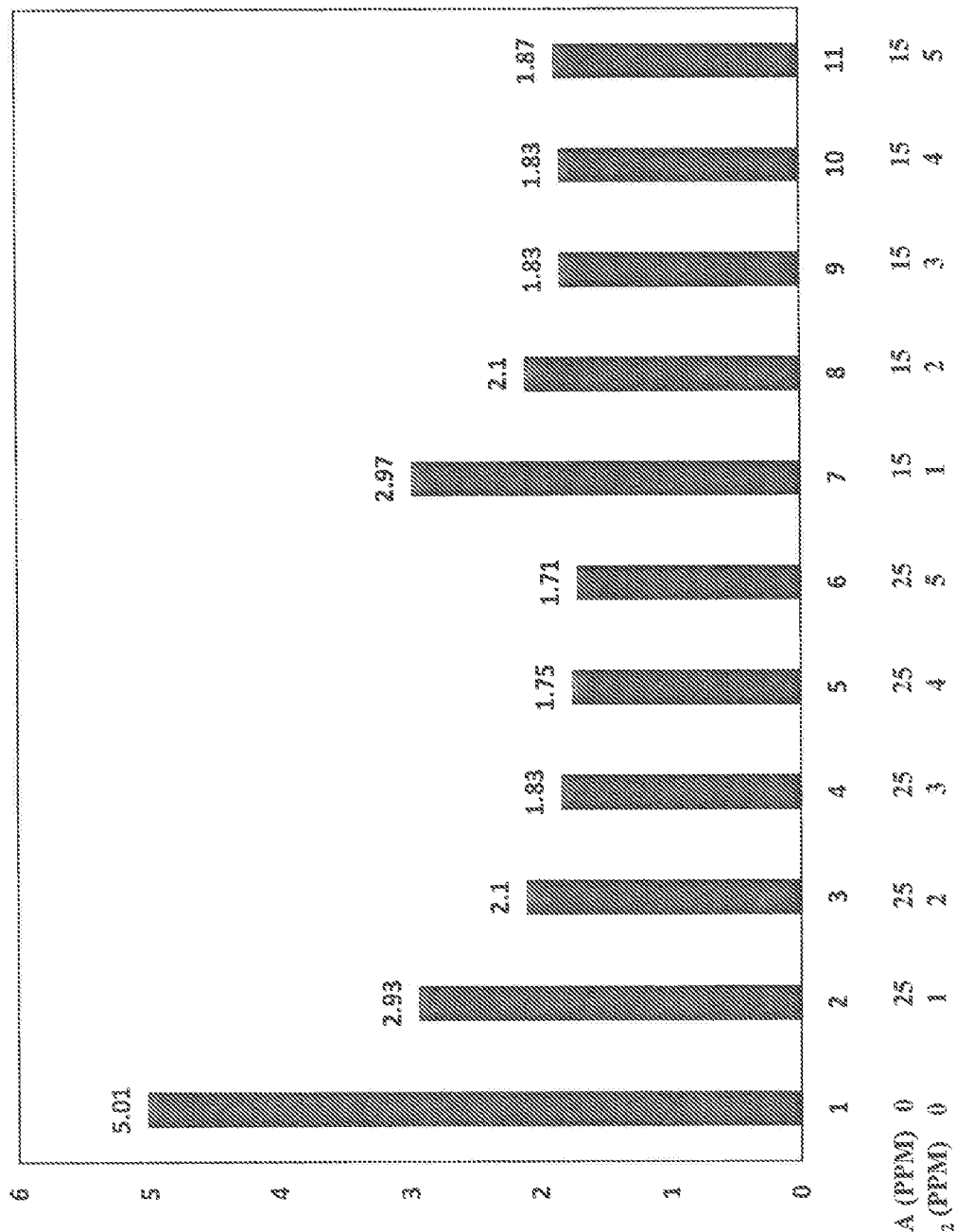

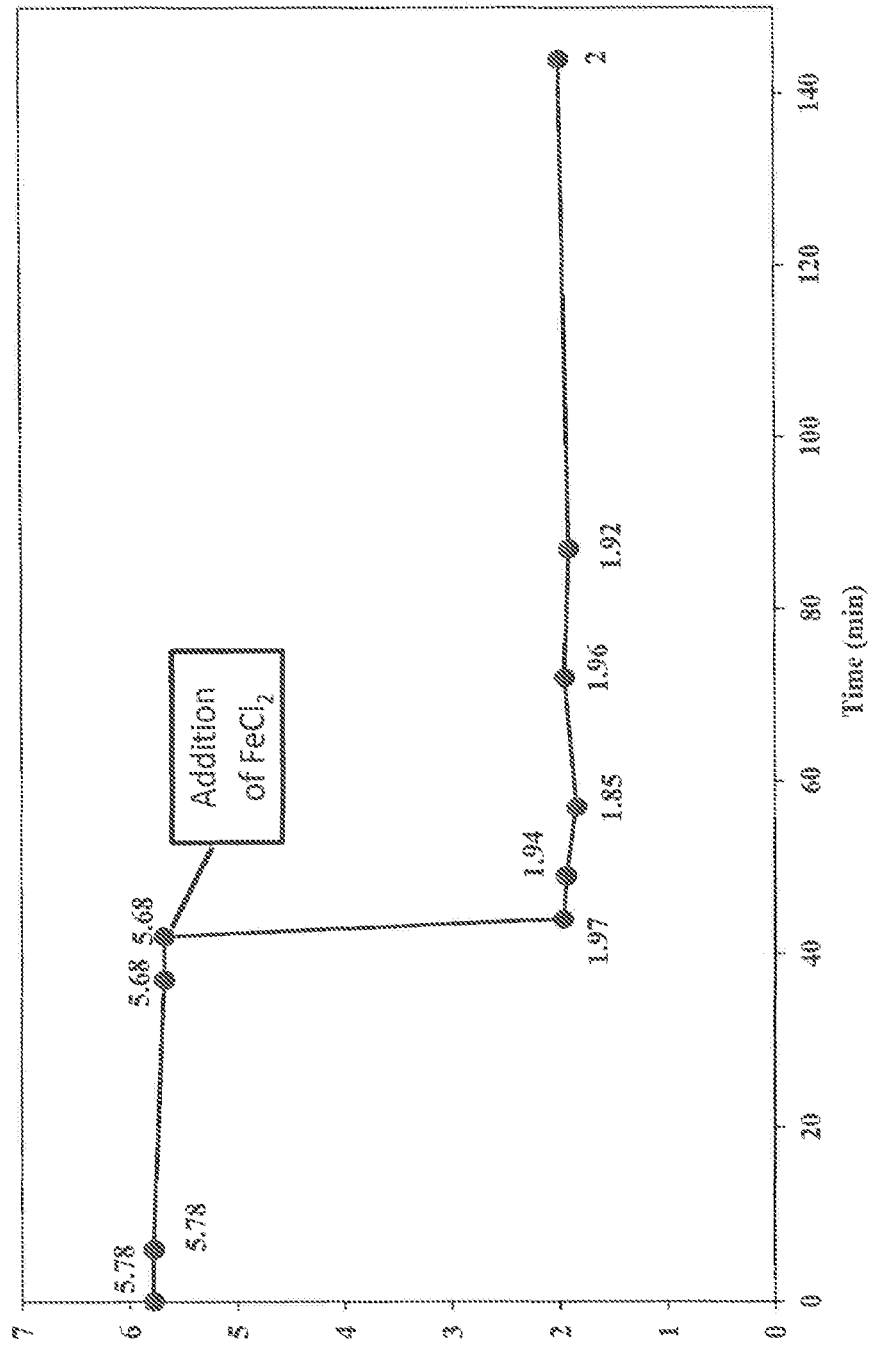

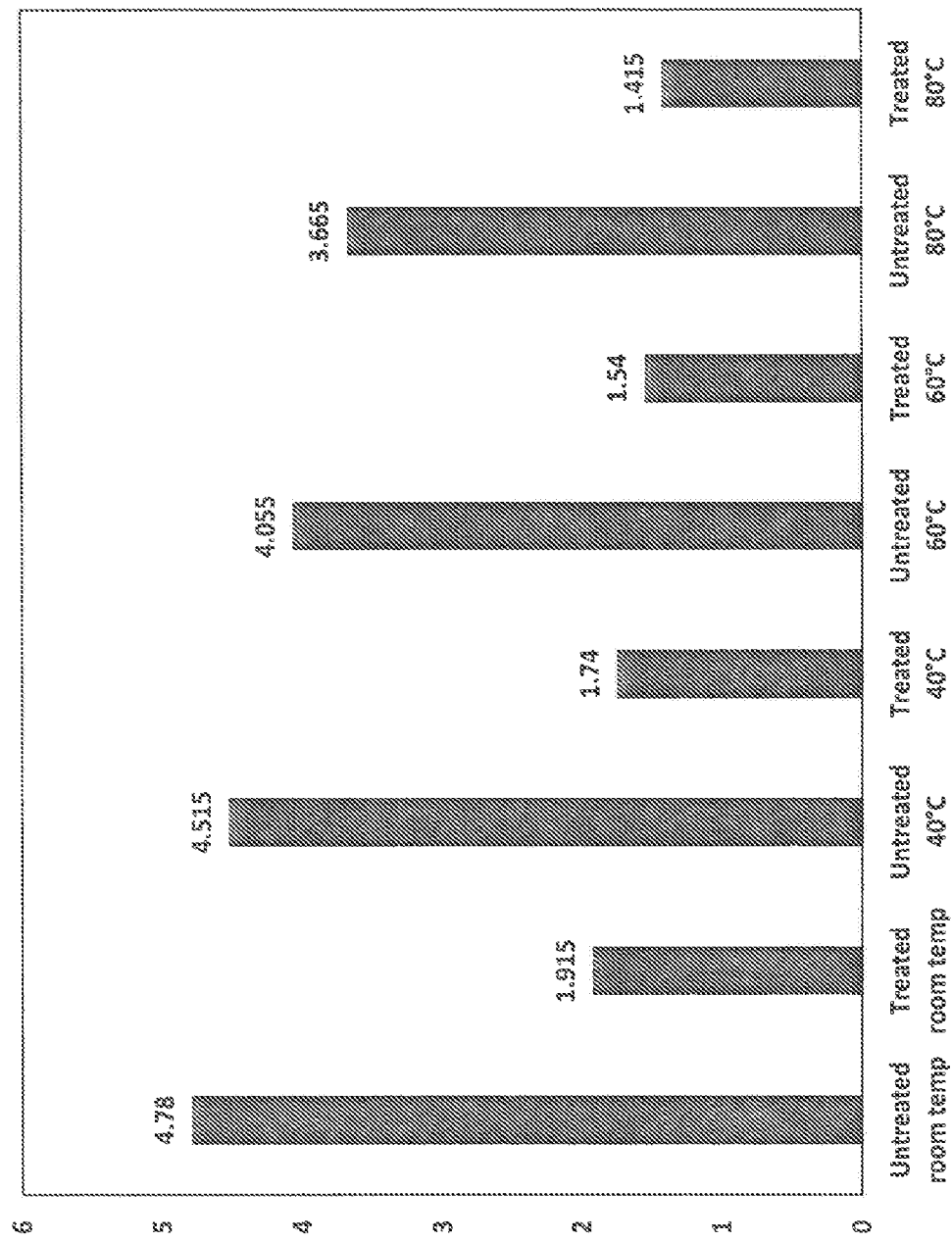

POLYMER FLOODING PRODUCED WATER TREATMENT

CROSS-REFERENCE TO PRIORITY APPLICATIONS

This application is a divisional of U.S. application Ser. No. 16/489,828, which has a 371(c) date of Aug. 29, 2019, which is a U.S. Nat'l Phase application of Int'l Appl. No. PCT/US2018/021162, filed Mar. 6, 2018, which claims priority to U.S. Provisional Appl. No. 62/575,733, filed Oct. 23, 2017, and U.S. Provisional Appl. No. 62/467,513, filed Mar. 6, 2017, each of which is incorporated herein by reference.

FIELD OF THE ART

The present disclosure generally relates to the treatment of produced water which comprises one or more water soluble polymers, e.g., from an enhanced oil recovery process, in order to reduce the viscosity thereof and/or degrade at least a portion of the one or more water soluble polymers contained therein.

BACKGROUND

Enhanced oil recovery (EOR) is a technique that can be used to increase the amount of unrefined petroleum (e.g., crude oil) that may be extracted from an oil reservoir an oil field). By way of example, using about 40-60% of the reservoir's original oil can typically be extracted, compared with only 20-40% using traditional primary and secondary recovery techniques (e.g., by water injection or natural gas injection). One type of EOR technique is polymer flooding, which typically involves the injection of large volumes of a polymer solution into a subterranean oil reservoir. The polymer solution can mobilize the oil towards a production well where it can be recovered. The produced water from a polymer flooding process can include various chemicals. These chemicals, including the polymer(s) used for the polymer flooding, may have a direct impact on viscosity and viscoelastic properties of the produced water. The properties and contents of the produced water can also influence discharge of the produced water into the sea, as polymers that may be used far polymer flooding, e.g., acrylamide (co)polymers such as partially hydrolyzed polyacrylamide (HPAM), typically may not be readily bio-degradable according to current regulations.

Current technologies for the treatment of produced water (e.g., produced water resulting from EOR processes) can include mechanical treatments (e.g., membrane filtration), chemical treatments (e.g., oxidizing agents), and biological treatments (e.g., microbiological processes). Further development of treatments for produced water would likely be beneficial for both offshore and onshore facilities.

BRIEF SUMMARY

The present disclosure generally relates to a process for treating produced water comprising one or more water soluble polymers, said process comprising: adding to the produced water at least one iron complex that comprises an iron compound and a complexing agent; and degrading at least a portion of the one or more water soluble polymers. In some embodiments, said produced water may be generated during any part of an enhanced oil recovery process or polymer flooding process. In some embodiments, said produced water may be at least partially aerobic. In some embodiments, said produced water may be anaerobic. In some embodiments, the treated produced water may have a viscosity of less than about 2.5 cP. In some embodiments, the treated produced water may have a viscosity that is at least about 64% less than the viscosity of the untreated produced water. In some embodiments, the treated produced water may have a viscosity that is at least about 3cP less than the viscosity of the untreated produced water. In some embodiments, the process may result in a significant reduction in viscosity of the produced water within in 10 minutes or less. In some embodiments, degrading at least a portion of one or more water soluble polymers may result in a 50% reduction in the molecular weight of said one or more water soluble polymers. In some embodiments, said one or more water soluble polymers may comprise at least one acrylamide (co)polymer. In some embodiments, the process may increase the biodegradability of said produced water and/or said one or more water soluble polymers. In some embodiments, the process may result in about a 20% or more increase in biodegradation of the one or more water soluble polymer after 28 days of incubation. In some embodiments, the treated produced water may be recycled or reused in the same or other industrial processes, or released into the environment (e.g., into the sea). In some embodiments, the process may not result in the formation of any precipitates.

In some embodiments, the process may further comprise treating the produced water in one or more of: mechanical treatments (e.g., membrane filtration), chemical treatments (e.g., oxidizing agents), and/or biological treatments (e.g., microbiological processes). In some embodiments, said iron compound may comprise iron sulfate, ferrous sulfate heptahydrate, or iron (II) chloride. In some embodiments, said complexing agent may comprise citric acid, EDTA, NTA, sodium acetate, lactic acid, L-glutamic acid, L-ascorbic acid, glycolic acid, sodium polyacrylate, diethylene triamine pentaacetic acid (DTPA), sodium triphosphate (STPD), 1-hydroxyethyldene-1,1-diphosphonic acid (HEDPA), gallic acid, caffeic acid, quercetin, oxalic acid, or sodium metabisulfite (SMBS). In some embodiments, said at least one iron complex may comprise: iron sulfate and citric acid; ferrous sulfate heptahydrate and citric acid; iron (II) chloride and ethylenediaminetetraacetic acid (EDTA); or iron (II) chloride and nitrilotriacetic acid (NTA). In some embodiments, the ratio of iron to complexing agent may be from about 100:1 to about 1:5. In some embodiments, adding said at least one iron complex may provide an iron concentration of 10,000 ppm or less in the treated produced water. In some embodiments, the treated produced water may have a pH that is equal to or less than the pH of the untreated produced water. In some embodiments, the process may occur at a temperature ranging from room temperature to about 80° C. In some embodiments, the process may occur at least partially on-site, at an onshore oil field, at an offshore oil field, at a treatment facility, at a disposal well, or at any other location where treatment of produced water occurs. In some embodiments, an increase in the dosage of the iron complex may result in a decrease in the viscosity of the produced water. In some embodiments, an increase in the dosage of the iron compound may result in an increase in the degradation of said one or more water soluble polymers.

In some embodiments, the process may further comprise adding at least one quenching agent to the produced water. In some embodiments, adding the at least one quenching agent may result in slowing, decreasing, preventing, inhibiting and/or stopping the degradation of the one or more water soluble polymers. In some embodiments, adding the at least one quenching agent may result in stabilizing or increasing the viscosity of the produced water. In some embodiments, the process may comprise adding at least one quenching agent and may further comprise adding at least one additional water soluble polymer to the produced water simultaneously with or after the addition of the at least one quenching agent. In some embodiments, the additional water soluble polymer may degrade 50% or less after adding it to the treated produced water. In some embodiments, a quenching agent may comprise sodium sulfite, sodium thiosulfate, ammonium bisulfate, hydroquinone, or a combination or mixture thereof. In some embodiments, the molar ratio of a quenching agent to an iron complex may be from about 1:1 to about 500:1.

Furthermore, the present disclosure generally encompasses a composition suitable for use in treating produced water, comprising: one or more quenching agents; and one or both of: (a) one or more iron complexes comprising an iron compound and a complexing agent; and (b) one or more water soluble polymers. In some embodiments, said iron compound may comprise iron sulfate, ferrous sulfate heptahydrate, or iron (II) chloride. In some embodiments, said complexing agent may comprise citric acid, EDTA, NTA, sodium acetate, lactic acid, L-glutamic acid, L-ascorbic acid, glycolic acid, sodium polyacrylate, DTPA, STPP, HEDPA, gallic acid, caffeic acid, quercetin, oxalic acid, or SMBS. In some embodiments, said at least one iron complex may comprise: iron sulfate and citric acid; ferrous sulfate heptahydrate and citric acid; iron (II) chloride and ethylenediaminetetraacetic acid (EDTA); or iron (II) chloride and nitrilotriacetic acid (NTA). In some embodiments, the ratio of iron to complexing agent may be from about 100:1 to about 1:5. In some embodiments, said quenching agent may comprise sodium sulfite, sodium thiosultate, ammonium bisulfite, hydroquinone, or a combination or mixture thereof. In some embodiments, the molar ratio of said quenching agent to said iron complex may be from about 1:1 to about 500:1.

BRIEF DESCRIPTION OF THE SEVERAL VIEWS OF THE DRAWING

FIG. 5B illustrates viscosity of several simulated produced water samples after an exemplary treatment process in anaerobic conditions with various iron complexes, in accordance with Example 4.

FIG. 6 illustrates a change in viscosity resulting from an exemplary treatment of a simulated produced water sample in anaerobic conditions with an iron complex, in accordance with Example 5.

FIG. 7 illustrates a change in viscosity resulting from an exemplary treatment of a simulated produced water sample in anaerobic conditions at various temperatures with an iron complex, in accordance with Example 7.

DETAILED DESCRIPTION

Figure 1:
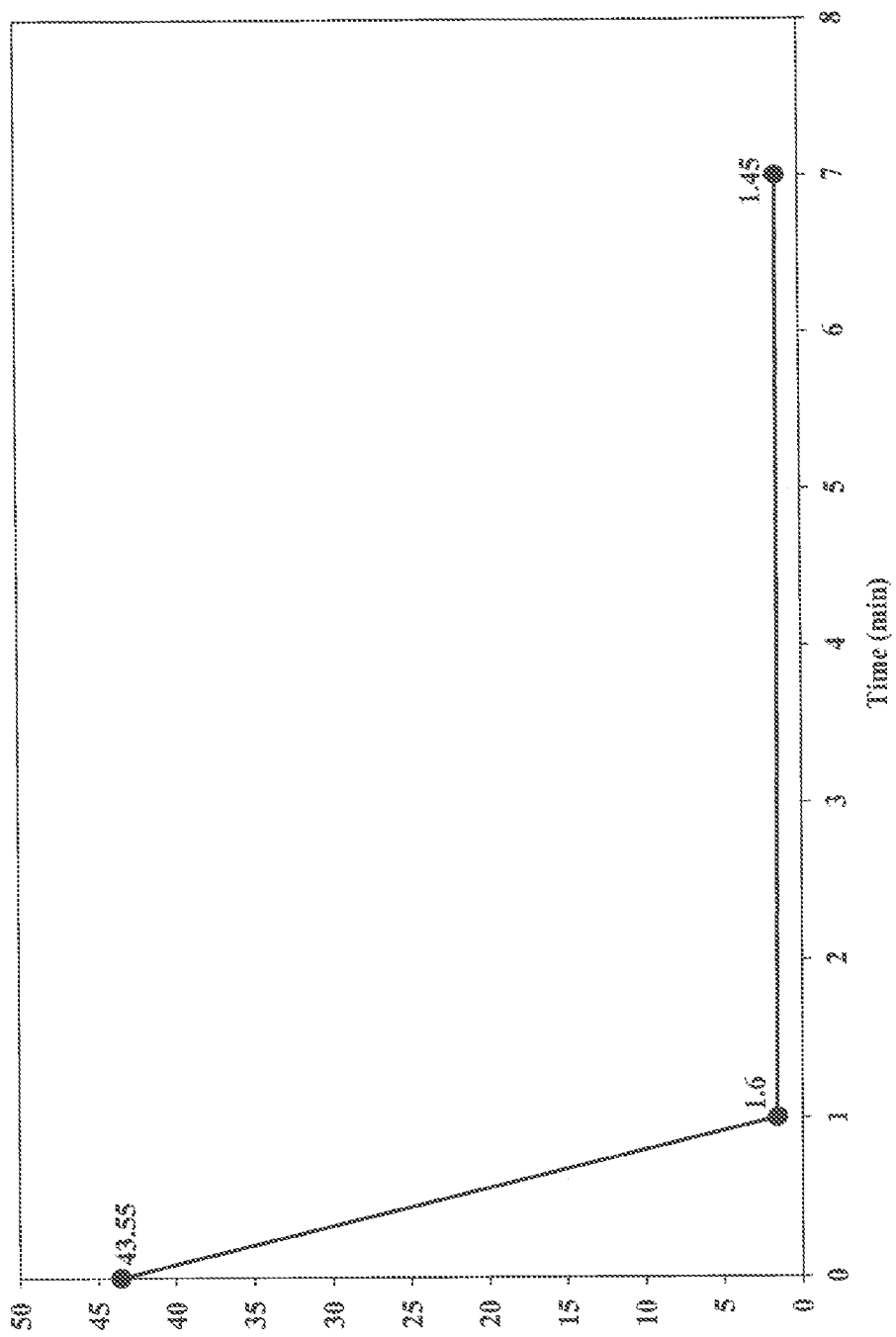
FIG. 1 illustrates a change in viscosity resulting from an exemplary treatment of a simulated produced water sample in aerobic conditions with an iron complex, in accordance with Example 1.

Many industrial processes such as enhanced oil recovery involve the use of water, often in copious amounts, in combination with one or more water soluble polymers, e.g., viscosifying or thickening polymers. The water soluble polymers often pass through to one or more waste streams resulting in aqueous streams or "produced water" that have undesirable viscosity and/or purity for reuse or release to the environment.

It is therefore an object of the invention to provide novel methods for treating such produced waters in order to reduce the viscosity thereof and/or to degrade at least a portion of the water soluble polymers comprised therein, e.g., so that the water may be reused in other industrial processes and/or released into the environment.

More specifically it is an object of the invention to provide processes and compositions for treating produced water comprising one or more water soluble polymers, comprising treating the produced water with one or more iron complexes and degrading at least a portion of the one or more water soluble polymers.

DETAILED DESCRIPTION

Definitions

As used herein the singular forms "a", "and", and "the" include plural referents unless the context dearly dictates otherwise. All technical and scientific terms used herein have the same meaning as commonly understood to one of ordinary skill in the art to which this invention belongs unless clearly indicated otherwise.

As used herein, the term "enhanced oil recovery" or "EOR" (sometimes also known as improved oil recovery ("IOR") or tertiary mineral oil production) generally refers to techniques for increasing the amount of unrefined petroleum (for example, crude oil) that may be extracted from an oil reservoir, such as an oil field. Examples of EOR techniques include, for example, miscible gas injection (e.g., carbon dioxide flooding), chemical injection (sometimes referred to as chemical enhanced oil recovery ("CEOR"), and which includes, for example, polymer flooding, alkaline flooding, surfactant flooding, micellar polymer flooding, conformance control operations, as well as combinations thereof such as alkaline-polymer flooding or alkaline-surfactant-polymer flooding), microbial injection, and thermal recovery (e.g., cyclic steam, steam flooding, or fire flooding). In some embodiments, the EOR operation may include a polymer ("P") flooding operation, an alkaline-polymer ("AP") flooding operation, a surfactant-polymer ("SP") flooding operation, an alkaline-surfactant-polymer ("ASP") flooding operation, a conformance control operation, or any combination thereof.

As used herein, the terms "polymer flood" or "polymer flooding" generally refer to a chemical enhanced EOR technique that typically involves injecting an aqueous fluid that is viscosified with one or more water-soluble polymers through injection boreholes into an oil reservoir to mobilize oil left behind after primary and/or secondary recovery. As a general result of the injection of one or more polymers, the oil may be forced in the direction of the production borehole, and the oil may be produced through the production borehole. Details of exemplary polymer flooding and of polymers suitable for this purpose are disclosed, for example, in "Petroleum, Enhanced Oil Recovery, Kirk-Othmer, Encyclopedia of Chemical Technology, online edition, john Wiley & Sons, 2010", which is herein incorporated by reference in its entirety.

One or more surfactants may be injected (or formed in situ) as part of the EOR technique. Surfactants may function to reduce the interfacial tension between the oil and water, which may reduce capillary pressure and improve mobilization of oil. Surfactants may be injected with polymers (e.g., a surfactant-polymer (SP) flood), or formed in-situ (e.g., an alkaline-polymer (AP) flood), or a combination thereof (e.g., an alkaline-surfactant-polymer (ASP) flood). As used herein, the terms "polymer flood" and "polymer flooding" encompass all of these EOR techniques.

As used herein, the term "monomer" generally refers to nonionic monomers, anionic monomers, cationic monomers, zwitterionic monomers, betaine monomers, and amphoteric ion pair monomers.

As used herein, the terms "polymer," "polymers," "polymeric," and similar terms are used in their ordinary sense as understood by one skilled in the art, and thus may be used herein to refer to or describe a large molecule (or group of such molecules) that may comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by, e.g., polymerizing a particular monomer. Unless otherwise specified, a polymer may also comprise a "copolymer" that may comprise two or more different recurring units that may be formed by, e.g., copolymerizing, two or more different monomers, and/or by chemically modifying one or more recurring units of a precursor polymer. Unless otherwise specified, a polymer or copolymer may also comprise a "terpolymer" that may comprise polymers that may comprise three or more different recurring units. The term "polymer" as used herein is intended to include both the acid form of the polymer as well as its various salts. Polymers may be amphoteric in nature, that is, containing both anionic and cationic substituents, although not necessarily in the same proportions.

As used herein the term "nonionic monomer" generally refers to a monomer that possesses a neutral charge. Exemplary nonionic monomers may comprise but are not limited to comprising monomers selected from the group consisting of acrylamide ("AMD"), methacrylamido, vinyl, allyl, ethyl, and the like, all of which may be substituted with a side chain selected from, for example, an alkyl, aryl alkyl, dialkyl, ethoxyl, and/or hydrophobic group. In an exemplary embodiment, a nonionic monomer may comprise AMD. In some embodiments, nonionic monomers may comprise but are not limited to comprising vinyl amide (e.g., acrylamide, methacrylamide, N-methylacrylamide, N,N-dimethylacrylamide), acryloylmorpholine, acrylate, maleic anhydride, N-vinylpyrrolidone, vinyl acetate, N-vinyl formamide and their derivatives, such as hydroxyethyl (methyl)acrylate $CH_2=CR-COO-CH_2CH_2OH$ (I) and $CH_2=CR-CO-N(Z1)(Z2)$ (2) N-substituted (methyl)acrylamide (II). R=H or Me; Z1=5-15C alkyl; 1-3C alkyl substituted by 1-3 phenyl, phenyl or 6-12C cycloalkyl (both optionally substituted) and Z2=H; or Z1 and Z2 are each 3-10C alkyl; (II) is N-tert, hexyl, tert, octyl, methylundecyl, cyclohexyl, benzyl, diphenylmethyl or triphenyl acrylamide. Nonionic monomers include dimethylaminoethylacrylate ("DMAEMA"), dimethylaminoethyl methacrylate ("DMAEM"), N-isopropylacrylamide and N-vinyl formamide. Nonionic monomers can be combined for example form a terpolymer of acrylamide, N-vinyl formamide, and acrylic acid.

As used herein, the term "anionic monomers" may refer to either anionic monomers that are substantially anionic in whole or (in equilibrium) in part, at a pH in the range of about 4.0 to about 9.0. The "anionic monomers" may be neutral at low pH (from a pH of about 2 to about 6), or to anionic monomers that are anionic at low pH.

Examples of anionic monomers which may be used herein include but are not limited to those comprising acrylic, methacrylic, maleic monomers and the like, calcium diacrylate, and/or any monomer substituted with a carboxylic acid group or salt thereof. In some embodiments, these anionic monomers may be substituted with a carboxylic acid group and include, for example, acrylic acid, and methacrylic acid. In some embodiments, an anionic monomer which may be used herein may be a (meth)acrylamide monomer wherein the amide group has been hydrolyzed to a carboxyl group. Said monomer may be a derivative or salt of a monomer according to the embodiments. Additional examples of anionic monomers comprise but are not limited to those comprising sulfonic acids or a sulfonic acid group, or both. In some embodiments, the anionic monomers which may be used herein may comprise sulfonic function that may comprise, for example, 2-acrylamido-2-methylpropane sulfonic acid (acrylamido tertiary butyl sulfonic acid or "ATBS"). In some embodiments, anionic monomers may comprise organic acids. In some embodiments, anionic monomers may comprise acrylic acid, methacrylic acid, maleic acid, itaconic acid, acrylamido methylpropane sulfonic acid, vinylphosphonic acid, styrene sulfonic acid and their salts such as sodium, ammonium and potassium. Anionic monomers can be combined for example to form a terpolymer of acrylamide, acrylic acid and 2-acrylamido-2-methylpropane sulfonic acid.

As used herein, the term "cationic monomer" generally refers to a monomer that possesses a positive charge. Examples of cationic monomers may comprise but are not limited to those comprising acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxyethyldimethylammonium sulfate, dimethylaminoethyl acrylate, dimethylaminopropylmethacrylamide, Q6, Q6o 4, and/or diallyldimethylammonium chloride ("DADMAC").

Said cationic monomers may also comprise but are not limited to those comprising dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyidialkylammonium halides such as diallyldiethylammonium chloride and diallyldimethylammonium chloride. Alkyl groups may generally but are not limited to those comprising $C_{1-8}$ alkyl groups. In some embodiments, cationic monomers may comprise quaternary ammonium or acid salts of vinyl amide, vinyl carboxylic acid, methacrylate and their derivatives. Exemplary cationic monomers may comprise but are not limited to comprising monomers selected from the group consisting of dimethylaminoethylacrylate methyl chloride quaternary salt, dimethylaminoethylmethacrylate methyl chloride quaternary salt, and diallyldimethyl ammonium chloride. Cationic monomers can be combined, for example to form a terpolymer of dimethylaminoethylmethacrylate methyl chloride quaternary salt, and diallyldimethyl ammonium chloride and acrylamide.

The term "water-soluble polymer" generally refers to any polymer that may dissolve and/or disperse in water. Said polymers may modify the physical properties of aqueous systems undergoing gelation, thickening, viscosification, emulsification/stabilization. Said polymers may perform a variety of functions, including but not limited to use as dispersing and suspending agents, stabilizers, thickeners, viscosifiers, gellants, flocculants and coagulants, film-formers, humectants, binders, and lubricants.

In the context of polymer flooding, an exemplary water-soluble polymer may include, but not be limited to including, one or more high molecular weight polyacrylamide and/or copolymers of acrylamide and further monomers, for example, vinylsulfonic acid or acrylic acid. Polyacrylamide may be partly hydrolyzed polyacrylamide (HPAM), in which some of the acrylamide units have been hydrolyzed to acrylic acid. Naturally occurring polymers may also be used, for example xanthan gar polyglycosylglucan, as described, for example, by U.S. Pat. No. 6,391,596 B1 or CA 832 277, which are hereby incorporated by reference in their entireties.

In exemplary embodiments, a water-soluble polymer may comprise one or more acrylamide (co)polymers. In exemplary embodiments, one or more acrylamide (co)polymers may be a polymer useful for enhanced oil recovery (EOR) applications. In a particular embodiment, a water-soluble polymer is a high molecular weight polyacrylamide or partially hydrolyzed products thereof.

According to exemplary embodiments, one or more acrylamide (co)polymers may be selected from water-soluble acrylamide (co)polymers. In various embodiments, acrylamide (co)polymers may comprise at least 30% by weight, or at least 50% by weight acrylamide units with respect to the total amount of all monomeric units in the (co)polymer.

Optionally, one or more acrylamide (co)polymers may comprise acrylamide and at least one additional monomer. In exemplary embodiments, an acrylamide (co)polymer may comprise less than about 50%, or less than about 40%, or less than about 30%, or less than about 20% by weight of the at least one additional monomer. In exemplary embodiments, the additional monomer may be a water-soluble, ethylenically unsaturated, in particular monoethylenically unsaturated, monomer. Exemplary additional water-soluble monomers may be miscible with water in any ratio, but it is typically sufficient that the monomers dissolve sufficiently in an aqueous phase to copolymerize with acrylamide. In general, the solubility of such additional monomers in water at room temperature, may be at least 50 g/L, preferably at least 150 g/L and more preferably at least 250 g/L.

Other exemplary water soluble monomers may comprise one or more hydrophilic groups. The hydrophilic groups may be functional groups that may comprise atoms selected from the group of O-, N-, S- or P-atoms. Nonlimiting examples of such functional groups comprise carbonyl groups >C=O, ether groups —O—, in particular polyethylene oxide groups —($CH_2$—$CH_2$—O—)$_n$-, where n is preferably a number from 1 to 200, hydroxy groups —OH, ester groups —C(O)O—, primary, secondary or tertiary amino groups, ammonium groups, amide groups —C(O)—NH— or acid groups such as carboxyl groups —COOH, sulfonic acid groups —$SO_3H$, phosphonic acid groups —$PO_3H_2$ or phosphoric acid groups —OP(OH)$_3$.

Exemplary monoethylenically unsaturated monomers comprising acid groups may comprise monomers comprising —COOH groups, such as acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acrylamidoalkylphosphonic acids or (meth)acryloyloxyalkylphosphonic acids. Said monomers may be used as salts.

The —COOH groups in polyacrylamide (co)polymers may not only be obtained by copolymerizing acrylamide and monomers comprising —COOH groups but also by hydrolyzing derivatives of —COOH groups after polymerization. For example, amide groups —CO—NH$_2$ of acrylamide may hydrolyze thus yielding —COOH groups.

Also to be mentioned are monomers which are derivatives of acrylamide, such as, for example, N-alkyl acrylamides and quaternary acrylamides, where the alkyl group may be $C_2$-$C_{28}$; N-methyl(meth)acrylamide, N,N'-dimethyl(meth)acrylamide, and N-methylolacrylamide; N-vinyl derivatives such as N-vinylformamide, N-vinylacetamide, N-yinylpyrrolidone or N-vinylcaprolactam; and vinyl esters, such as vinyl formate or vinyl acetate. N-vinyl derivatives may be hydrolyzed after polymerization to vinylamine units, vinyl esters to vinyl alcohol units.

Further exemplary monomers may comprise monomers comprising hydroxy and/or ether groups, such as, for example, hydroxyethyl(meth)acrylate, hydroxypropyl (meth)acrylate, allyl alcohol, hydroxyvinyl ethyl ether, hydroxyl vinyl propyl ether, hydroxyvinyl butyl ether or polyethyleneoxide(meth)acrylates.

Other exemplary monomers may be monomers comprising ammonium groups, i.e., monomers having cationic groups. Examples of said monomers may comprise salts of 3-trimethylanmionium propylacrylamides or 2-trimethylammonium ethyl(meth)acrylates, for example the corresponding chlorides, such as3-trimethylammonium propylacrylamide chloride (DIMAPAQUAT), and 2-trimethylammonium ethyl methacrylate chloride (MADAME-QUAT).

Yet other exemplary monomers may comprise monomers which may cause hydrophobic association of the (co)polymers. Such monomers may comprise, in addition to an ethylenic group and a hydrophilic part, a hydrophobic part. Such monomers are disclosed, for instance, in WO 2012/069477 A1, which is hereby incorporated by reference in its entirety.

In certain exemplary embodiments, one or more acrylamide (co)polymers may optionally comprise crosslinking monomers, i.e., monomers comprising more than one polymerizable group. In certain embodiments, one or more acrylamide (co)polymers may optionally comprise crosslinking monomers in an amount of less than about 0.5%, or about 0.1%, by weight, based on the amount of all monomers.

In an exemplary embodiment, one or more acrylamide (co)polymers may comprise at least one monoethylenically unsaturated monomer comprising acid groups, for example monomers that comprise at least one group selected from —COOH, —SO$_3$H or —PO$_3$H$_2$. Examples of such monomers may include, but are not limited to, acrylic acid, methacrylic acid, vinylsulfonic acid, allylsulfonic acid or 2-acrylamido-2-methylpropanesulfonic acid, particularly preferably acrylic acid and/or 2-acrylamido-2-methylpropanesulfonic acid, and most preferred acrylic acid or the salts thereof. In an exemplary embodiment, one or more acrylamide (co)polymers, or each of the one or more acrylamide (co) polymers, may comprise 2-acrylamido-2-methylpropanesulfonic acid or salts thereof. The amount of such monomers comprising acid groups may be from about 0.1% to about 70%, about 1% to about 50%, or about 10% to about 50% by weight based on the amount of all monomers.

In an exemplary embodiment, one or more acrylamide (co)polymers may comprise from about 50% to about 90% by weight of acrylamide units and from about 10% to about 50% by weight of acrylic acid units and/or their respective salts. In an exemplary embodiment, one or more acrylamide (co)polymers may comprise from about 60% to 80% by weight of acrylamide units and from 20% to 40% by weight of acrylic acid units.

In exemplary embodiments, one or more acrylamide (co)polymers may have a weight average molecular weight ($M_w$) of greater than about 5,000,000 Dalton, or greater than about 10,000,000 Dalton, or greater than about 15,000,000 Dalton, or greater than about 20,000,000 Dalton, or greater than about 25,000,000 Dalton.

As used herein, the terms "polyacrylamide" or "PAM" generally refer to polymers and co-polymers comprising acrylamide moieties, and the terms encompass any polymers or copolymers comprising acrylamide moieties, e.g., one or more acrylamide (co)polymers. Furthermore, PAMs may comprise any of the polymers or copolymers discussed herein. Additionally, the PAMs described herein, e.g., one or more acrylamide (co)polymers, may be provided in one of various forms, including, for example, dry (powder) form (e.g., DPAM), water-in-oil emulsion (inverse emulsion), suspension, dispersion, or partly hydrolyzed (e.g., HPAM, in which some of the acrylamide units have been, hydrolyzed to acrylic acid). In exemplary embodiments, PAMs, e.g., one or more acrylamide (co)polymers, may be used for polymer flooding. In exemplary embodiments, PAMS, e.g., one or more acrylamide (co)polymers, may be used in any EOR technique.

As used herein, the term "produced water" generally refers to any aqueous fluids produced during any type of industrial process, e.g., an oil or gas extraction or recovery process, or any portion thereof, such as but not limited to any enhanced oil recovery process or any portion thereof wherein the produced water comprises one or more polymers, e.g., one or more water-soluble polymers. Typically the produced water may be obtained during an industrial process involving the use of water, generally copious amounts of water, and the use of one or more water soluble polymers, e.g., viscosifying or thickening polymers, wherein the end product of such industrial process may be an aqueous material or "produced water" which may be of undesirable viscosity and/or purity because of the presence of an undesirable amount of said one or more water soluble polymers.

According to the exemplary embodiments, the produced water may be formed during any part of a process related to polymer flooding and may comprise any components and/or chemicals related to any part of said polymer flooding. This may be referred to as "polymer flooded produced water" or "polymer flooding produced water", and the term produced water is to be understood to encompass any type of polymer flooded produced water or polymer flooding produced water. Produced water may be anaerobic produced water or may be aerobic produced water.

As used herein, the term "iron" generally refers to any form of iron, for example, iron of any isotopic state, iron of any oxidation state, any form of an iron compound, such as, for example, iron (III) chloride, iron (II) chloride (also known as ferrous chloride), iron (III) chloride hexahydrate, and iron sulfate. According to the exemplary embodiments, the iron may be complexed, chelated, or associated in any way with any form of any other element, molecule, or compound, to provide an iron complex as described herein.

As used herein, the term "iron fate" generally refers to any form of iron sulfate, including but not limited to iron (II) sulfate and iron (III) sulfate.

As used herein, the terms "iron complex" or "iron complexes" generally refer to a combination of, or mixture comprising, iron and a complexing agent. In exemplary embodiments, an iron complex may be used as a part of a process or method wherein degradation of a polymer is desired. Furthermore, said iron complex may degrade said polymer through an oxidation reaction.

As used herein, the term "complexing agent" generally refers to any compound that can be complexed chelated with iron to form an iron complex as described herein. Exemplary complexing agents include, but are not limited to, citric acid, ethylenediaminetetraacetic acid (EDTA), nitrilotriacetic acid (NTA), sodium acetate, lactic acid, L-glutamic acid, L-ascorbic acid, glycolic acid, sodium polyacrylate, diethylene triamine pentaacetic acid (DTPA), sodium triphosphate (STPP), 1-hydroxyethildene-1,1-diphosphonic acid (HEDPA), gallic acid, caffeic acid, quercetin, sodium meta bisulfite (SMBS), or a combination or mixture thereof.

As used herein, the term "coagulant" generally may refer to an agent that may typically destabilize colloidal suspensions. Coagulants may comprise iron-based coagulants, such as ferrous chloride, e.g., KEMIRA® PIX-411 sold by Kemira, and/or iron chloride. Other examples of iron-based coagulants may include, but are not limited to including iron sulfate and polyferric sulphate. Additional coagulants may comprise hut are not limited to comprising inorganic coagulants such as aluminium sulfate ("ALS") and other metal sulfate and gypsum, organic coagulants such as polyamines and polyDADMACs, and other inorganic and organic coagulants known in the art.

Furthermore, a coagulant may comprise a poly(diallyldimethyl ammonium chloride) ("polyDADMAC") compound; an epi-polyamine compound; a polymer that may comprise one or more quaternized ammonium groups, such as acryloyloxyethyltrimethylammonium chloride, methacryloyloxyethyltrimethylammonium chloride, methacrylamidopropyltrimethylammonium chloride, acrylamidopropyltrimethylammonium chloride; or a mixture thereof. An inorganic coagulant may, for example, reduce, neutralize or invert electrical repulsions between particles. Inorganic coagulants may comprise but are not limited to inorganic salts such as aluminum chloride, aluminum sulfate, aluminum chlorohydrate, polyaluminum chloride, polyaluminum silica sulfate, ferric chloride, ferrous chloride, ferric sulfate, ferric chloride sulfate, polyferric sulfate, ferrous sulfate, lime, calcium chloride, calcium sulfate, magnesium chloride, sodium aluminate, various commercially available iron or aluminum salts coagulants, or combinations thereof. In some embodiments, a coagulant may comprise a combination or mixture of one or more organic coagulants with one or more inorganic coagulants. In some embodiments, a coagulant may comprise a combination or mixture of any of the above coagulants.

As used herein, the terms "quencher", "quenching agent", and the like, generally refer to any material, technique, method, process, composition, and/or compound that may be used to decrease, slow down, prevent, inhibit and or stop a reaction, i.e., a quenching agent "quenches" a reaction. For example, a quenching agent may be used to decrease, slow down, prevent, inhibit and/or stop a polymer degradation reaction, such as the degradation of a polymer that may occur through use of the processes and methods, such as those comprising iron complexes, described herein, Said quenching agent may slow down, decrease, prevent inhibit and/or stop an oxidation reaction, such as an oxidation reaction in which a polymer may be degraded, wherein said polymer may be present in produced water. In exemplary embodiments, a quenching agent may comprise sodium sulfite, sodium thiosulfate, ammonium bisulfite, and/or hydroquinone. In some embodiments, more than one quenching agent may be used so long as the use of more than one quenching agent results in a desired effect or result.

Processes, Uses, and Compositions

Disclosed herein are processes for the treatment of produced water, e.g., produced water resulting from any part of an EOR process, such as a polymer flood, comprising one or more water-soluble polymers by adding to the produced water at least one iron complex that comprises an iron compound and a complexing agent; and degrading at least a portion of the one or more water soluble polymers contained therein. The resultant treated water may be recycled and reused in one or more other processes or released into the environment.

Also disclosed herein are one or more iron complexes suitable for use in exemplary processes for the treatment of produced water, comprising one or more water-soluble polymers resulting from at least a portion of the EOR process. Additionally, the present disclosure generally relates to treatment of produced water with an iron complex as described herein, wherein a quenching agent is further added to said treated produced water. Said quenching agent may decrease, slow down, prevent, inhibit, and/or stop a polymer degradation reaction that may occur as a result of treatment of said produced water with said iron complex.

The produced water used in the disclosed methods may be generated during any part of an enhanced oil recovery process or polymer flooding process and such produced water may be aerobic or anaerobic, e.g., partially aerobic. Produced waters treated using the disclosed methods may yield treated produced waters having different viscosities, e.g., dependent on the viscosity of the produced water prior to treatment, the time of treatment and the amount of and specific polymers contained therein. For example treated produced water obtained using the disclosed methods may have a viscosity of less than about 2.5 cP. Alternatively produced water treated using the disclosed methods may have a viscosity that is at least about 64% less than the viscosity of the untreated produced water. Still alternatively produced water treated using the disclosed methods may result in treated produced water having a viscosity that is at least about 3 cP less than the viscosity of the untreated produced water.

The treatment methods which are disclosed herein may be utilized to quickly and substantially reduce the viscosity of treated produced waters, e.g., within in 10 minutes or less and may result in substantial, e.g., a 50% reduction in the molecular weight of said one or more water soluble polymers contained therein, e.g., an acrylamide (co)polymer. In some embodiments, the subject treatment methods may be utilized to increase the biodegradability of said produced water and/or said one or more water soluble polymers, e.g., the treatment method may result in about a 20% or more increase in biodegradation of the one or more water soluble polymer after 28 days of incubation.

Produced waters which are treated using the disclosed methods may be recycled or reused in the same or other industrial processes, or released into the environment (e.g., into the sea). Such treated produced waters may or may not result in the formation of precipitates.

Produced waters which are treated using the disclosed methods additionally may be subjected to one or more of: mechanical treatments (e.g., membrane filtration), chemical treatments (e.g. oxidizing agents), and/or biological treatments (e.g., microbiological processes).

Various iron compounds may be utilized in the subject treatment methods, e.g., the iron compound may comprise iron sulfate, ferrous sulfate heptahydrate, or iron (II) chloride or combinations of any of the foregoing. Also, various complexing agent may be utilized in the disclosed treatment methods, e.g. citric acid, EDTA, NTA, sodium acetate, lactic acid, L-glutamic acid, L-ascorbic acid, glycolic acid, sodium polyacrylate, diethylene triamine pentaacetic acid (DTPA), sodium triphosphate (STPP), 1-hydroxyethyldene-1-diphosphonic acid (HEDPA), gallic acid, caffeic acid, quercetin, oxalic acid, sodium metabisulfite (SMBS) or combinations of any of the foregoing.

The subject treatment methods may be used to produce treated produced water possessing different amounts of iron. For example in some instances the addition of at least one iron complex to the produced water may result in a treated produced water with an iron concentration of 10,000 ppm or less.

The subject treatment methods may be used to produce treated produced water possessing different viscosities, e.g., the change in viscosity may be affected by the amount and type of polymers contained therein, the specific iron and complexing agent and amount, and the time of treatment. For example, an increase in the dosage of the iron complex as a result of the treatment method may result in a decrease in the viscosity of the produced water. Further, an increase in the dosage of the iron compound may result in an increase in the degradation of said one or more water soluble polymers.

The subject treatment methods will have variable effects on the pH of the treated produced water and yield treated produced waters having different pH levels, e.g., dependent on the and composition of the produced water prior to treatment and the treatment conditions. For example treatment of produced water as disclosed herein may yield treated produced water having a pH that is equal to or less than the pH of the untreated produced water.

Treatment of produced waters according to the subject treatment methods may be effected at different temperatures, e.g., dependent on the particular produced water and the environment where the produced water is produced. For example, the treatment process may occur at a temperature ranging from room temperature to about 80° C.

Treatment of produced waters according to the subject treatment methods may be effected at any desired site where produced water is present and desirably treated as disclosed herein. For example, such process may occur at least partially on-site, such as at an onshore oil field, at an offshore oil field, at a treatment facility, at a disposal well, or at any other location where treatment of produced water occurs.

The subject methods for treating produced waters may or may not include the use of quenching agents. In some instances it may be desirable to add at least one quenching agent to the produced water so as to achieve one or more benefits, e.g., in order to slow, decrease prevent, inhibit and/or stop the degradation of the one or more water soluble polymers. For example the addition of quenching agent(s) may result in stabilizing or increasing the viscosity of the produced water. Such quenching agents if used they may be added at various times during the treatment method. For example, in some treatment methods at least one quenching agent and at least one additional water soluble polymer may be added to the produced water simultaneously or the at least one quenching agent may be added after the addition of additional water soluble polymer.

Different known quenching agents or combinations thereof may be utilized. For example such quenching agents may comprise sodium sulfite, sodium thiosultate, ammonium hydroquinone, or a combination or mixture thereof. The amount of quencher if utilized during the treatment method may be varied substantially. For example in some embodiments the molar ratio of quenching agent to iron complex may vary from about 1:1 to about 500:1.

The subject treatment methods may include the addition of different amounts and/or types of additional water soluble polymer. In some treatment methods the additional water soluble polymer may degrade 50% or less after adding it to the treated produced water.

Furthermore, the present disclosure provides novel combinations and compositions suitable for use in treating produced water, comprising: one or more quenching agents; and one or both of: (a) one or more iron complexes comprising an iron compound and a complexing agent; and (b) one or more water soluble polymers. In some embodiments, said iron compound may comprise iron sulfite, ferrous sulfate heptahydrate, or iron (II) chloride. In some embodiments, said complexing agent may comprise citric acid, EDTA, NTA, sodium acetate, lactic acid, L-glutamic acid, L-ascorbic acid, glycolic acid, sodium polyacrylate, DTPA, STPP, HEDPA, gallic acid, caffeic acid, quercetin, oxalic acid, or SMBS. In some embodiments, said at least one iron complex may comprise: iron sulfate and citric acid; ferrous sulfate heptahydrate and citric acid; iron (II) chloride and ethylenediaminetetraacetic acid (EDTA); or iron (II) chloride and nitrilotriacetic acid (NTA). In some embodiments, the ratio of iron to complexing agent may be from about 100:1 to about 1:5. In some embodiments, said quenching agent may comprise sodium sulfite, sodium thiosulfate, ammonium bisulfite, hydroquinone, or a combination or mixture thereof. In some embodiments, the molar ratio of said quenching agent to said iron complex may be from about 1:1 to about 500:1.

According to various embodiments, the produced water which is treated by the methods disclosed herein may result from a polymer flood process. In exemplary embodiments, the produced water comprises one or more water-soluble polymers. In exemplary embodiments, the produced water comprises one or more acrylamide-containing (co)polymers.

According to the exemplary embodiments, the process for treatment of produced water involves adding to the produced water one or more iron complexes. The subject treatment methods include the use of different iron complexes. For example such iron complexes may include complexes of iron sulfate and citric acid; ferrous sulfate heptahydrate and citric acid; iron (II) chloride and ethylenediaminetetraacetic acid (EDTA); or iron (II) chloride and nitrilotriacetic acid (NTA) or combinations of any of the foregoing. Also, the ratio of iron to complexing agent contained in iron complexes which are used in the subject treatment methods may vary, e.g., by way of example the ratios may vary from about 100:1 to about 1:5.

An exemplary iron complex comprises any form of iron that may be complexed, chelated, or associated with a complexing agent. An exemplary iron complex may comprise any combination of iron and complexing agent. In some embodiments, one or more iron complexes may comprise iron and EDTA. In some embodiments, one or more iron complexes to be used in a process for the treatment of produced water may comprise iron and NTA. In some embodiments, one or more iron complexes may comprise iron and sodium acetate. In some embodiments, one or more iron complexes may comprise iron and lactic acid. In some embodiments, one or more iron may comprise iron and L-glutamic acid. In some embodiments, one or more iron complexes may comprise iron and L-ascorbic acid. In some embodiments, one or more iron complexes may comprise iron and glycolic acid. In some embodiments, one or more iron complexes may comprise iron and sodium polyacrylate. In some embodiments, one or more iron complexes may comprise iron and DTPA. In some embodiments, one or more iron complexes may comprise iron and STPP. In some embodiments, one or more iron complexes may comprise iron and HEDPA. In some embodiments, one or more iron complexes may comprise iron and gallic acid. In some embodiments, one or more iron complexes may comprise iron and caffeic acid. In some embodiments, one or more iron complexes may comprise iron and quercetin. In some embodiments, one or more iron complexes may comprise iron and oxalic acid. In some embodiments, one or more iron complexes may comprise iron and SMBS. Exemplary iron complexes include, but are not limited to, iron (II) chloride and ethylenediaminetetraacetic acid (EDTA), iron (II) chloride and nitrilotriacetic acid (NTA), and iron sulfate and citric acid, e.g., ferrous sulfate heptahydrate and citric acid.

In some embodiments, the process of treating produced water comprises adding one or more iron complexes to result in an iron concentration in the produced water of 5 ppm or less, 10 ppm or less, 25 ppm or less, 50 ppm or less, 100 ppm or less, 1,000 ppm or less, 5,000 ppm or less, or 10,000 ppm or less.

In some embodiments, an increased dosage of one or more iron complexes used in the processes for the treatment of produced water comprising one or more polymers may result in a corresponding increase in degradation of said one or more polymers. In some embodiments, an increased dosage of iron relative to that of a complexing agent, wherein said iron and complexing agent may be used in the processes the treatment of produced water comprising one or more polymers, may result in an increase in degradation of said one or more polymers that corresponds with the increased dosage of said iron.

In some embodiments, an increased dosage of one or more iron complexes used in the processes for the treatment of produced water may result in a corresponding decrease in the viscosity of said produced, water, or at least no increase in the viscosity of the produced water.

In some embodiments, the concentration of the complexing agent in the exemplary iron complex may be at least about 2 times, 3 times, 4 times, or 5 times greater than that of iron in the iron complex. In some embodiments, the concentration of the complexing agent in the exemplary iron complex may be equal to that of iron in the iron complex. In some embodiments, the concentration of the iron in the exemplary iron complex may be at least about 2 times, 3 times, 4 times, 5 times, 10 times, 20 times, 50 times, or 100 times or greater than that of a complexing agent. In some embodiments, the ratio of iron to complexing agent is from about 100:1 to about 1:5, such as wherein the ratio of iron to complexing agent is about 100:1, about 90:1, about 80:1, about 70:1, about 60:1, about 50:1, about 40:1, about 30:1, about 20:1, about 10:1, about 5:1, about 2:1, about 1:2, about 1:3, about 1:4, or about 1:5.

According to the various embodiments, the iron complex is pre-mixed or combined prior to its introduction to the produced water. In various exemplary embodiments, the iron and the complexing agent may be added to the produced water separately but simultaneously. In various exemplary embodiments, the iron and the complexing agent may be added to the produced water at different times and/or different locations.

In some embodiments, the dosage of the one or more iron complexes used in the exemplary treatment processes is that which produces a necessary or desired effect. Furthermore, in some embodiments, the dosage of either iron or complexing agent that comprise one or more iron complexes used in the exemplary treatment processes is that which produces a necessary or desired effect. The dosage of the one or more iron complexes or the dosage of either iron or complexing agent that comprise one or more iron complexes may be determined, for example, at least in part based upon the quality of the produced water, the components of the produced water, the concentration of the polymer in the produced water, the type of polymer inn the produced water, the aerobic or anaerobic condition of the water and/or the treatment process, the type of iron complex, as well as the desired result.

In exemplary embodiments, the process for the treatment of produced water using one or more iron complexes comprises mixing of the iron complex with the produced water. In general the type of mixing used may be the type that produces a necessary or desired effect. In some embodiments, the mixing may be accomplished in a fluid conduit during transport of the produced water, e.g., with turbulent flow, baffles, or static mixers. In some embodiments, mixing may occur using a mixing apparatus such as, for example, a mixing tank with a mixer, a horizontal mixer, or a screw mixer. The mixing tank typically may be equipped with a blade mixer. In some embodiments, magnetic stirring may be used for mixing. In some embodiments, an overhead mixer may be used for mixing.

In an exemplary process for the treatment of produced water using one or more iron complexes, the treatment process may comprise mixing of one or more iron complexes with produced water, and the mixing time may be any amount of time that produces a necessary or desired effect. In some embodiments the mixing time may be 1 minute or less, 10 minutes or less, 20 minutes or less, 60 minutes or less, 2 hours or less, 24 hours or less, 48 hours or less, 72 hours or less, 96 hours or less, or 96 hours or more.

In exemplary embodiments, the process for the treatment of produced water using one or more iron complexes may be conducted, on-site, at any onshore oil field, at any offshore oil field, at a treatment facility, at a disposal well, or at any other location where treatment of produced water may occur.

According to various embodiments, the process for the treatment of produced water comprising one or more polymers may be a completely anaerobic process. In other embodiments, the process for the treatment of produced water comprising one or more polymers may be at least partially aerobic. In various exemplary embodiments, the produced water prior to treatment ma comprise substantially no oxygen. In various exemplary embodiments, the produced water prior to treatment may comprise relatively low levels of oxygen. In various exemplary embodiments, the produced water may comprise oxygen. In various exemplary embodiments, oxygen may be introduced to the produced water before, during or after the process for treatment of the produced water.

In some embodiments, the exemplary processes for the treatment of produced water may result in the lack the formation of precipitates.

In some embodiments, processes for the treatment of produced water comprising one or more polymers by using one or more iron complexes may improve the biodegradability of the produced water. In some embodiments, the process for the treatment of produced water comprising one or more polymers, may result in said one or more polymers becoming biodegradable in sea water. For example, an exemplary process for the treatment of produced water comprising one or more polymers may result in more than 20% degradation of the one or more polymers in sea water after 28 days of incubation. In some embodiments, an exemplary process for the treatment of produced water comprising one or more polymers, using one or more iron complexes may result in degradation of 37% or more of treated polymer in sea water following 28 days of incubation. In some embodiments, the exemplary process to treat produced water using one or more iron complexes may result in 20% or more, 22% or more, 24% or more, 26% or more, 28% or more, 30% or more, 32% or more, 24% or more, 36% or more, 38% or more, 40% or more, or 45% or more, biodegradation after 28 days of incubation, wherein said biodegradation criteria may be those of the Organic for Economic Co-Operation and Development ("OECD") (please see OECD guidelines for testing of chemicals, specifically test #306: Biodegradability in Seawater, both of which are hereby incorporated by reference in their entirety). In some embodiments, the process for the treatment of produced water comprising one or more polymers using one or more iron complexes, may allow for the treated produced water to be discharged directly into the sea. In some embodiments, the process for the treatment of produced water comprising one or more polymers using one or more iron complexes may allow for existing water treatment processes to handle polymer flooded produced water.

In some embodiments, processes for the treatment of produced water comprising one or more polymers by using one or more iron complexes may degrade said one or polymers, e.g., reduce the molecular weight of said one or more polymers in the produced water. For example, the exemplary process for treating produced water may result in a reduction in the molecular weight of the one or more polymers of about 10 fold to 50-fold or more. In some embodiments, the process to treat produced water comprising one or more polymers, using one or more iron complexes may result in a reduction of the molecular weight of said one or more polymers by 50 times or more, 49.5 times or more, 45 times or more, 40 times or more, 35 times or more, 30 times or more, 25 times or more, 20 times or more, 15 times or more, 10 times or more, 9.5 times or more, or 5 times or more, or 2 times or more. Expressed differently, the exemplary process to treat produced water comprising one or more water soluble polymers may result in at least a 50% reduction in the molecular weight of the one or more polymers, or at least 60% or at least 70% or at least 80% or at least 90% or greater reduction in the molecular weight of the one or more polymers.

In some embodiments, the exemplary process to treat produced water using one or more iron complexes may reduce the viscosity of the produced water. The exemplary treatment process may be used to reduce the viscosity of the produced water to any necessary or desired viscosity. For example, in certain embodiments, it is desirable to reduce the viscosity of the produced water so that it can be transported and handled by existing equipment. According to some embodiments, the exemplary treatment process may result in a treated water having a viscosity that is at least about 64% to about 97% below the viscosity of the untreated produced water. In other exemplary embodiments, the exemplary treatment process may result in a treated water having a viscosity of about 3 cP to about 47 cP less than the untreated produced water. In other exemplary embodiments, the treatment process may result in a treated water that has a viscosity below about 2.5 cP. In some embodiments, the exemplary process to treat produced water, using one or more iron complexes may result in a reduction in viscosity of said produced water to 2.5 cP or less, 2.4 cP or less, 2.3 cP or less, 2.2 cP or less, 2.1 cP or less, 2.0 cP or less, 1.9 cP or less, 1.8 cP or less, 1.7 cP or less, 1.6 cP or less, 1.5 cP or less, 1.4 cP or less, 1.3 cP or less, 1.2 cP or less, 1.1 cP or less, or 1.0 cP or less. According to the exemplary embodiments, the process for treatment of the produced water may reduce the viscosity to a level that is beneficial for reinjection or disposal purposes. In some embodiments, processes for the treatment of produced water by using one or more iron complexes may reduce the viscosity of the produced water in rapid manner, e.g., in about 10 minutes or less, or in about 5 minutes or less, or in about 2 minutes or less. In some embodiments, the treatment process may occur at temperatures ranging from about room temperature to about 80° C., and said treatment process may result in a reduction of the viscosity of the treated produced water regardless of the temperature at which the process occurs.

In some embodiments, the process to treat produced water using one or more iron complexes may result in a pH value of the produced water that may be almost the same as it may have been before the addition of said one or more iron complexes. In some embodiments, the process to treat produced water using one or more iron complexes may result in a pH value of the produced water that may be slightly lower (more acidic) than it may have been before the addition of said one or more iron complexes.

In exemplary embodiments, the process to treat produced water using one or more iron complexes may be used alone, or it may be used in combination with one or more additional processes for the treatment of produced water. Other exemplary processes for produced water treatment include, for example, mechanical treatments (e.g., membrane filtration), chemical treatments (e.g., oxidizing agents), and biological treatments (e.g., microbiological processes).

In exemplary embodiments, the treated water resulting from the exemplary process may be recycled to one or more oil recovery processes, such as an EOR process.

In exemplary embodiments, the treated water resulting from the exemplary processes may be reused in one or more other processes.

In exemplary embodiments, the treated water resulting from the exemplary processes may be discharged to the environment.

Additionally, the present disclosure generally relates to treatment of produced with an iron complex as described herein, wherein at least one quenching agent is further added to said treated produced water. Furthermore, the present embodiments generally related to a process of treating produced water that includes the addition or formation of one or more iron complexes during treatment of the produced water, further wherein at least one quenching agent is added to slow, decrease, prevent, inhibit, and/or stop the degradation or further degradation of water soluble polymers and/or to increase or maintain the viscosity of the produced water. In some embodiments, said at least one quenching agent may be added while water soluble polymers are present in the produced water in order to slow, decrease, prevent, inhibit and/or stop the degradation or further degradation of said at least one water soluble polymer and/or to increase or maintain the viscosity of the produced water, and/or said at least one quenching agent is added contemporaneous or prior to the addition of at least one water soluble polymer in order to slow, decrease, prevent, and/or stop the degradation of said added at least one water soluble polymer and/or to increase or maintain the viscosity of the produced water. Furthermore, in come embodiments, a process of treating produced water may comprise (i) at least one quenching agent is added while water soluble polymers are present in the produced water in order to slow, decrease, prevent, and/or stop the degradation or further degradation of said at least one water soluble polymer comprised in the produced water prior to the addition of the at least one quenching agent and/or to increase or maintain the viscosity of the produced water and (ii) additional at least one water soluble polymer is added contemporaneous or after the addition of the at least one quenching agent in order to slow, decrease, prevent, and/or stop the degradation of said further added least one water soluble polymer and/or to increase or maintain the viscosity of the produced water. Moreover, a process of treating produced water may include the addition of at least one quenching agent at different times during treatment of the produced water in order to slow, decrease, prevent, inhibit and/or stop the degradation or further degradation of water soluble polymers or another material susceptible to degradation by the iron complexes and/or to increase or maintain the viscosity of the produced water.

In some embodiments, said quenching agent may decrease, slow down, prevent, inhibit and/or stop a polymer degradation reaction that may occur as a result of treatment of said produced water with said iron complex. In exemplary embodiments, produced water may be treated as described herein, a quenching agent may be added, and subsequently more polymer, e.g., water soluble polymer, may be added to said produced water, wherein addition of quenching agent protects the newly added polymer such that said polymer degrades to a lesser amount than said polymer would degrade without the addition of said quenching agent. In exemplary embodiments, a quenching agent may comprise sodium sulfite, sodium thiosulfate, ammonium bisulfite, and/or hydroquinone.

In an exemplary embodiments, a quenching agent may comprise sodium sulfite, and, optionally furthermore, said sodium sulfite may be pumped into a well with other oxygen scavengers to prevent the corrosion of drilling equipment in an oxidizing environment. Moreover, fresh polymer, e.g., water soluble polymer, may be added following the addition of said sodium sulfite.

In some embodiments, a quenching agent may be added to a treated produced water sample at a 1:1, 2:1, 5:1, 10:1, 50:1, 100:1, 150:1, 200:1, 250:1, 300:1, 350:1, 400:1, 450:1, or 500:1 molar ratio of said quenching agent to an iron complex that was used to treat said produced water sample. In further embodiments, addition of a quenching agent to a treated produced water sample may comprise addition of fresh polymer to said treated produced water sample after addition and/or during addition of said quenching agent. Said quenching agent may result in a 50% reduction or less, 45% reduction or less, 40% reduction or less, 35% reduction or less, 34% reduction or less, 33% reduction or less, 32% reduction or less, 31% reduction or less, 30% reduction or less, 29% reduction or less, 28% reduction or less, 25% reduction or less, 20% reduction or less, 15% reduction or less, 10% reduction or less, 5% reduction or less, or 1% reduction or less of the viscosity of said produced water that has been treated with quenching agent and optionally to which fresh polymer has been added. Furthermore, addition of said quenching agent may result in the viscosity of treated produced water, with or without the addition of fresh polymer, retaining 50% or more, 55% or more, 60% or more, 65% or more, 70% or more, 75% or more, 80% or more, 85% or more, 90% or more, or 95% or more of its viscosity value before the addition of said quenching agent.

In exemplary embodiments, treatment of produced water as described herein in conjunction with addition of a quenching agent may slow down, decrease, prevent, inhibit and/or stop polymer degradation such that the treated produced water may be used to dissolve new polymer for injection without degradation of said new polymer. In some embodiments, addition of a quenching agent to treated produced water may slow down, decrease, prevent, inhibit and/or stop an oxidizing effect that may occur due to use of an iron complex to treat produced water. In exemplary embodiments, said produced water may be anaerobic produced water, said anaerobic produced water may be treated as discussed herein, and further a quenching agent may be added to said treated anaerobic produced water prior to or with addition of new polymer, wherein said new polymer may not be degraded or may not be degraded as much as said polymer would be without the addition of said quenching agent. Moreover, in exemplary embodiments a quenching agent may be added to produced water that has been treated as described herein, i.e., treated with one or more iron complexes, after the viscosity of said produced water has reached a desired value. In exemplary embodiments, said produced water may be anaerobic produced water. In exemplary embodiments, produced water may be treated with one or more iron complexes as described herein, and said treated water may be used as make-up water for injection with the addition of quenching agent, such as, for example, sodium sulfite, as said quenching agent may protect any polymer that may be newly added to said treated produced water from degradation. For example, after addition of said quenching agent, if new polymer is added to said treated water, the new polymer may degrade 10% or less, 15% or less, 20% or less, 25% or less, 30% or less, 35% or less, 40% or less, 45% or less, or 50% or less as a result of addition of said quenching agent.

In exemplary embodiments, treatment of produced water as described herein in conjunction with addition of a quenching agent may result in a water which may be reused in the same or other industrial processes or released into the environment. In further exemplary embodiments, treatment of produced water as described herein in conjunction with addition of a quenching agent may occur on-site, at any onshore oil field, at any offshore oil field at a treatment facility, at a disposal well, or at an other location where treatment of produced water occurs.

Furthermore, the present disclosure generally encompasses a composition suitable for use in treating produced water, comprising the combination of (i) one or more quenching agents and either or both of the following (ii) one or more iron complexes, and one or more water soluble polymers; wherein the one or more quenching agents are capable of preventing or inhibiting the degradation of the one or more water soluble polymer by the one or more iron complexes if said one or more water soluble polymers is present. In exemplary embodiments, said composition may comprise (i) one or more quenching agents, (ii) one or more iron complexes, and (iii) one or more water soluble polymers. Moreover, in further exemplary embodiments, said produced water may comprise anaerobic produced water and/or polymer flooded produced water. In some embodiments, said produced water may comprise one or more PAMs, e.g., any polymers or co-polymers comprising acrylamide moieties, e.g., one or more acrylamide (co)polymers. Said one or more PAMs may comprise one or more HPAMs and/or one or more DPAMs.

In further embodiments, said one or more iron complexes of said composition may comprise iron (II) chloride and ethylenediaminetetraacetic acid (EDTA). Furthermore, said one or more iron complexes may be added to the produced water to provide an iron concentration of 5 ppm or less, 10 ppm or less, 25 ppm or less, 50 ppm or less, 100 ppm or less, 1,000 ppm or less, 5,000 ppm or less, or 10,000 ppm or less in some embodiments. In exemplary embodiments, said quenching agent of said composition may comprise said quenching agent comprises sodium sulfite, sodium thiosulfate, ammonium bisulfite, and/or hydroquinone, preferably sodium sulfite and/or hydroquinone. Said quenching agent may be present in said composition at a molar ratio of 1:1, 2:1, 5:1, 10:1, 50:1, 100:1, 150:1, 200:1, 250:1, 300:1, 350:1, 400:1, 450:1, or 500:1 of quenching agent to iron complex in some embodiments.

The following examples are presented for illustrative purposes only and are not intended to be limiting.

EXAMPLES

Example 1 Treatment of Produced Water in Aerobic Conditions Using Iron-Citrate Complex In this example, a simulated produced water sample was treated under aerobic conditions using an exemplary iron complex comprising-ferrous sulfate heptahydrate and citric acid. For this example, the simulated produced water sample included a commercially available water soluble, high molecular weight anionic polyacrylamide based polymer (Polymer A).

To prepare the simulated produced water samples, one gram of dry powder Polymer A was dissolved in 1 L hot tap water by mixing it for 20 minutes at 500 rpm at 38° C. The initial concentration of the polymer in the simulated produced water solution was 4,000 ppm. The initial viscosity of the simulated produced water sample was recorded.

Figure 2:
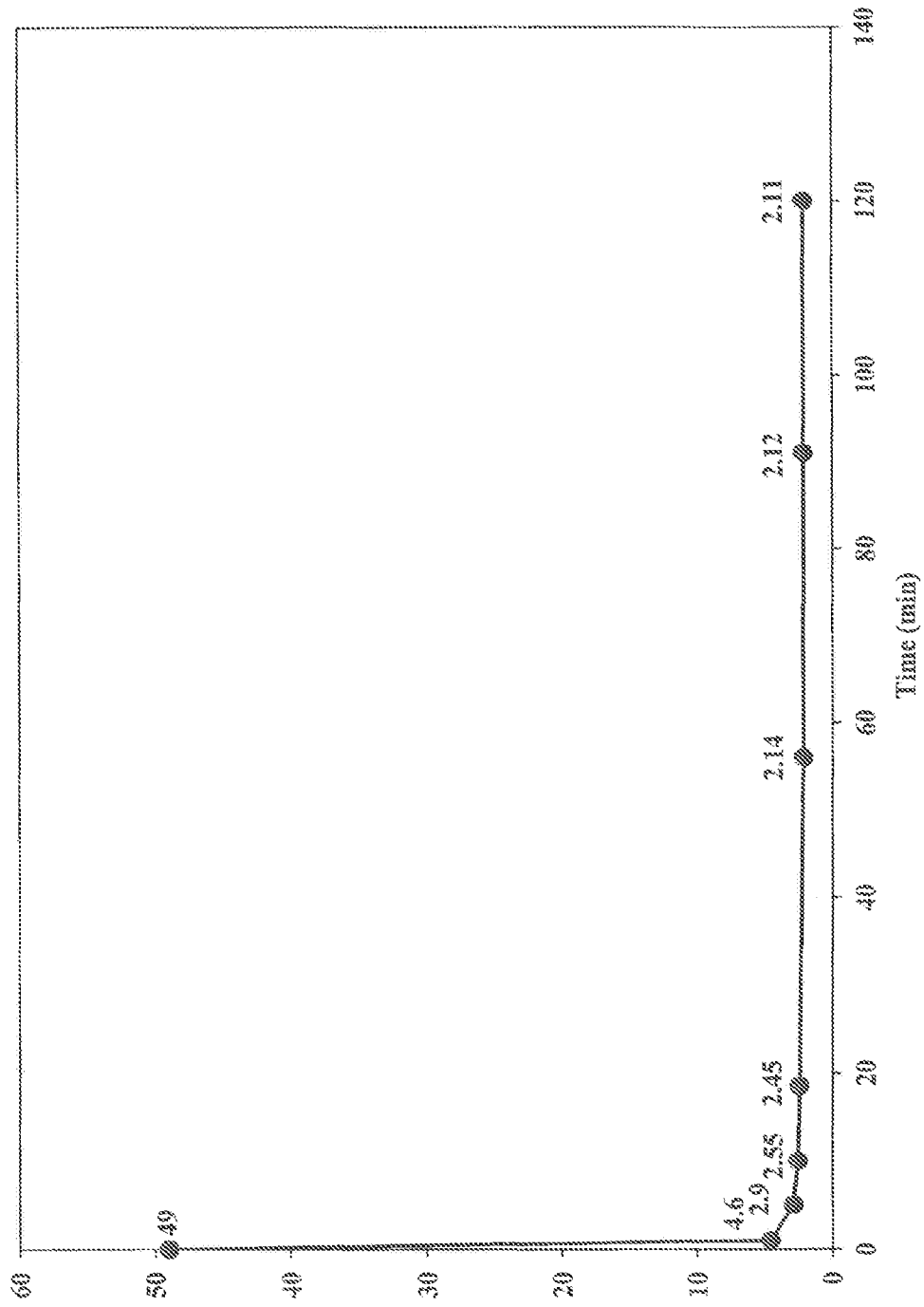
FIG. 2 illustrates a change in viscosity resulting from an exemplary treatment of a simulated produced water sample in aerobic conditions with an iron complex, in accordance with Example 1.

Citric acid was added to the simulated produced water sample to obtain a concentration of 100 ppm (0.1 g), then ferrous sulfate heptahydrate was added to obtain concentration of 1,000 ppm (1 g, FIG. 1) or 50 ppm (0.05 g, FIG. 2). The viscosity of the treated simulated produced water sample was measured and recorded over time (See FIG. 1 and FIG. 2). The experiment duration was 2 hours.

FIG. 1 and FIG. 2 demonstrated a sharp decrease in the viscosity of the solution at the initial stage of the reaction. After the initial state of the reaction, a decrease in viscosity continued to be observed over time, eventually reaching a plateau. These results demonstrated the effectiveness of iron sulfate and citric acid in decreasing the viscosity of the solution by degrading the polymer.

Example 2: Treatment of Produced Water Sample in Aerobic Conditions Using Iron-Citrate Complex Having 100 ppm Ferrous Sulfate Concentration In this example, a simulated produced water sample was treated under aerobic conditions using exemplary iron complex comprising ferrous sulfate heptahydrate and citric acid. In this example, the ferrous sulfate concentration was 100 ppm. For this example, the simulated produced water sample was a salt water solution that included a commercially available water soluble, high molecular weight anionic polyacrylamide based polymer (Polymer B), which is representative of a polymer used in polymer flooding techniques.

To prepare the simulated produced water samples, 30 grams of NaCl were dissolved in 1 L of hot tap water to make produce a 3% salt solution. One gram of a Polymer B was added to the salt solution, and dissolved by mixing it for 2 hours at 500 rpm at 38° C. The initial concentration of the polymer in the simulated produced water solution was 1,000 ppm. The initial pH was 5.85, and the initial viscosity was 7.12 cP.

Citric acid was added to the simulated produced water solution to obtain a concentration of 100 ppm. After 30 minutes, 0.1 g of ferrous sulfate heptahydrate was added to obtain a concentration of 100 ppm.

Figure 3:
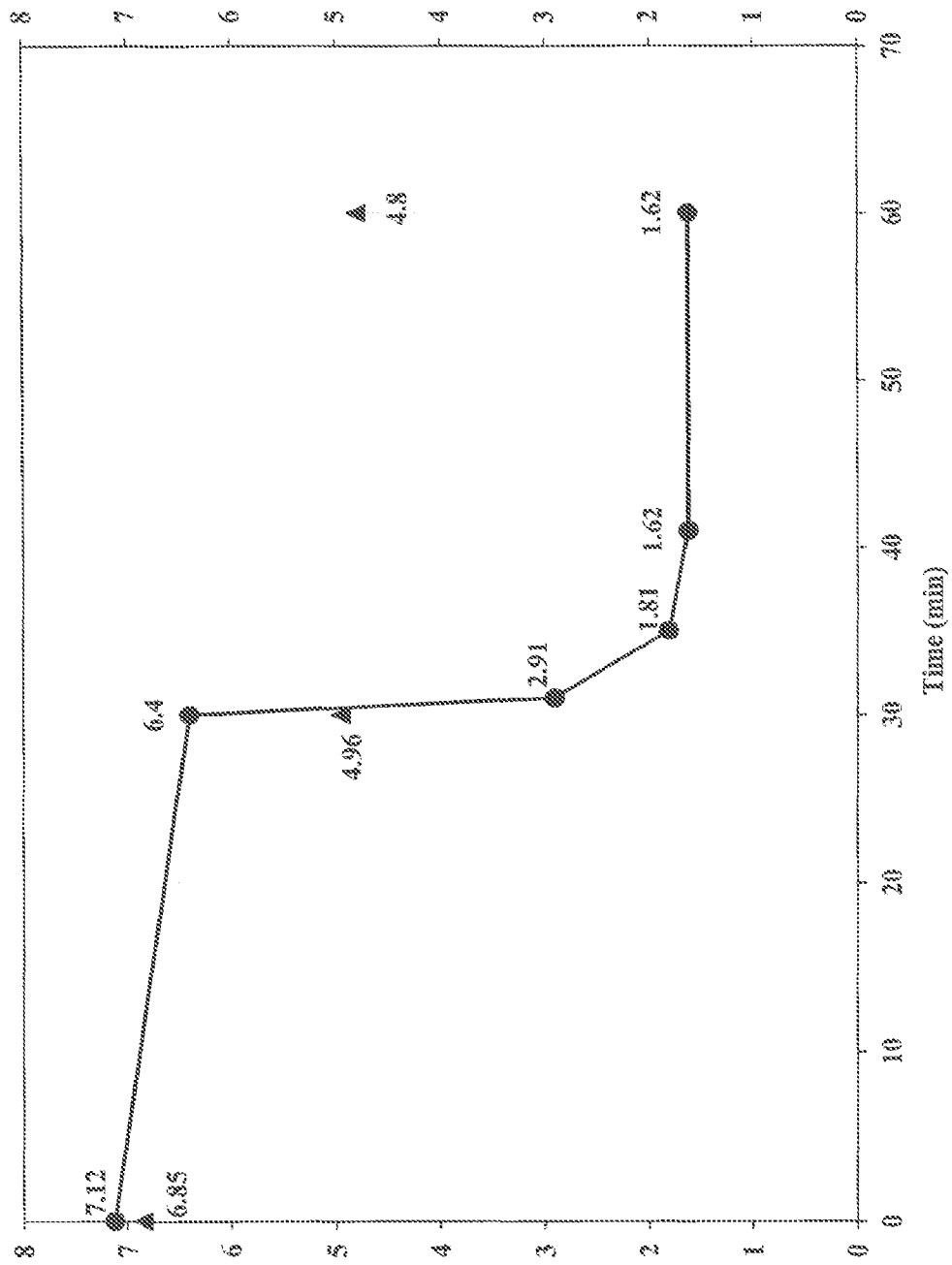
FIG. 3 illustrates a change in viscosity and pH resulting from an exemplary treatment of a simulated produced water sample in aerobic conditions with an iron complex, in accordance with Example 2. The black circles in FIG. 3 represent viscosity values, and the black triangles in FIG. 3 represent pH values.

Starting when the citric acid was added, the viscosity and pH were measured over time (see FIG. 3). After two hours the mixing and heating were turned off. After 48 hours no precipitates were observed.

Gel permeation chromatography ("GPC") was used to determine the molecular weight (MW) of the polymer before and after treatment, recorded in Table 1, below.

Referring to FIG. 3, a fast and significant decrease in viscosity occurred when both reagents were mixed together, and a decrease continued to be observed over time, eventually reaching a plateau. No precipitation was observed during these experiments. The final viscosity was within target range to facilitate the operation of produced water treatment devices (e.g., including oil-water separation step(s)).

Example 3: Treatment of Produced Water Sample in Aerobic Conditions Using Iron-Citrate Complex Having Ferrous Sulfate Concentration of 10 ppm In this example, a simulated produced water sample was treated under aerobic conditions using an exemplary iron complex comprising ferrous sulfate heptahydrate and citric acid. In this example, the ferrous sulfate concentration was 10 ppm. For this example, the simulated produced water sample was a salt water solution that included a commercially available water soluble, high molecular weight anionic polyacrylamide based polymer (Polymer B), which is representative of a polymer used in polymer flooding techniques.

For this Example one gram of Polymer B was dissolved in 1 L hot tap water by mixing it for 1 hour 40 minutes at 500 rpm at 38° C. The initial concentration of the polymer in the simulated produced water sample was 1,000 ppm. The initial pH was 7.74, and the initial viscosity was 9.76 cP. Then, 30 g of NaCl was added to make 3% salt concentration. The pH and the viscosity was 7.26 and 9.71 cP, respectively.

Citric acid was added to the simulated produced water sample to obtain a concentration of 100 ppm. Lastly, of a 1% solution of ferrous sulfate heptahydrate (to obtain 10 ppm ferrous sulfate heptahydrate final concentration) was added.

Figure 4:
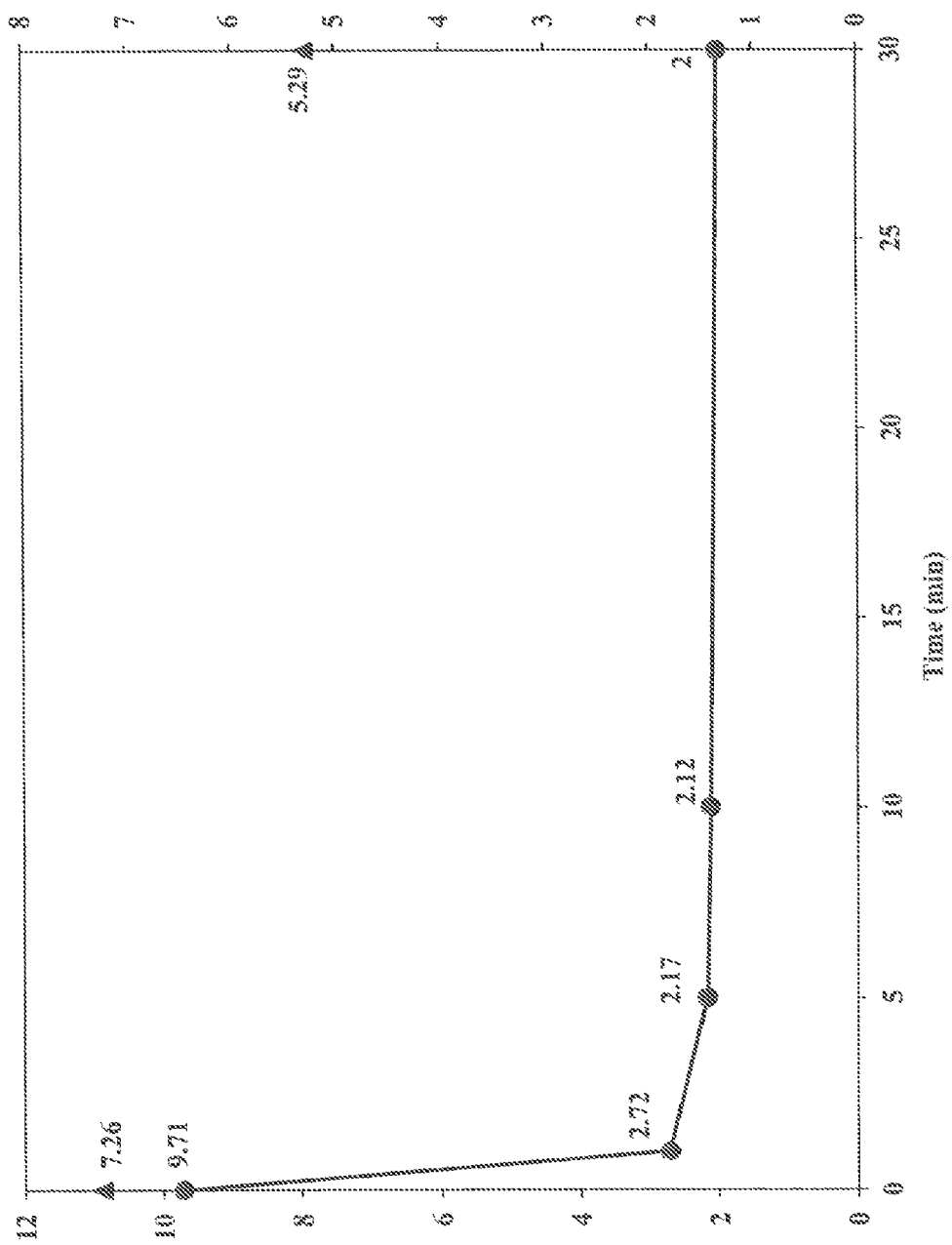
FIG. 4 illustrates a change in viscosity and pH resulting from an exemplary treatment of a simulated produced water sample with an iron complex, in accordance with Example 3. The black circles in FIG. 4 represent viscosity values, and the slack triangles in FIG. 4 represent pH values.

The viscosity and pH were measured and recorded over time (FIG. 4). After two hours the mixing and heating were turned off. After 48 hours no precipitates were observed.

Gel permeation chromatography ("GPC") was used to determine the molecular weight (MW) of the polymer before and after treatment, recorded in Table 1, below.

Referring to FIG. 4, a fast and significant decrease in viscosity occurred when both reagents were mixed together, and a decrease continued to be observed over time, eventually reaching a plateau. No precipitation was observed during these experiments. Not wishing to be bound by theory, it may be that citric acid (citrate) acted as complexing agent in these experiments and thereby prevented oxidation and precipitation of iron, which then led to the lack of precipitate formation. The final viscosity was within target range to facilitate the operation of produced water treatment devices (e.g., including oil-water separation step(s)).

Referring to Table 1, a comparison of the results of Examples 2 and 3 demonstrates that increased amounts of iron sulfate, and thereby the iron complex, that were added led to more pronounced degradation effects as based on molecular weight analysis (see Table 1). In all cases, a reduction of pH with the iron-citrate complex was observed and could be attributed to the initial dosage of citric acid.

TABLE 1

VARIATIONS IN MOLECULAR WEIGHT FOR SIMULATED PRODUCED WATER SAMPLES BEFORE AND AFTER TREATMENT

| Example | $Fe(II)SO_4 \cdot H_2O$ Content | Molecular weight (g/mol) | | MW reduction |
|---|---|---|---|---|
| | | Before Treatment | After Treatment | |
| 2 | 100 ppm | 5.3E+06 | 1.07E+05 | 49.5 times smaller |
| 3 | 10 ppm | 5.4E+06 | 5.65E+05 | 9.5 times smaller |

Example 4 Anaerobic Treatment of Polymer Flooding Produced Water

In this example, a simulated produced water sample was treated under anaerobic conditions using various exemplary iron complexes comprising ferrous chloride and EDTA NTA. For this example, the simulated produced water sample was a salt water solution that included a commercially-available water soluble, high molecular weight partially hydrolyzed anionic polyacrylamide based polymer (Polymer C), which is representative of a polymer used in polymer flooding techniques.

Figure 5A:
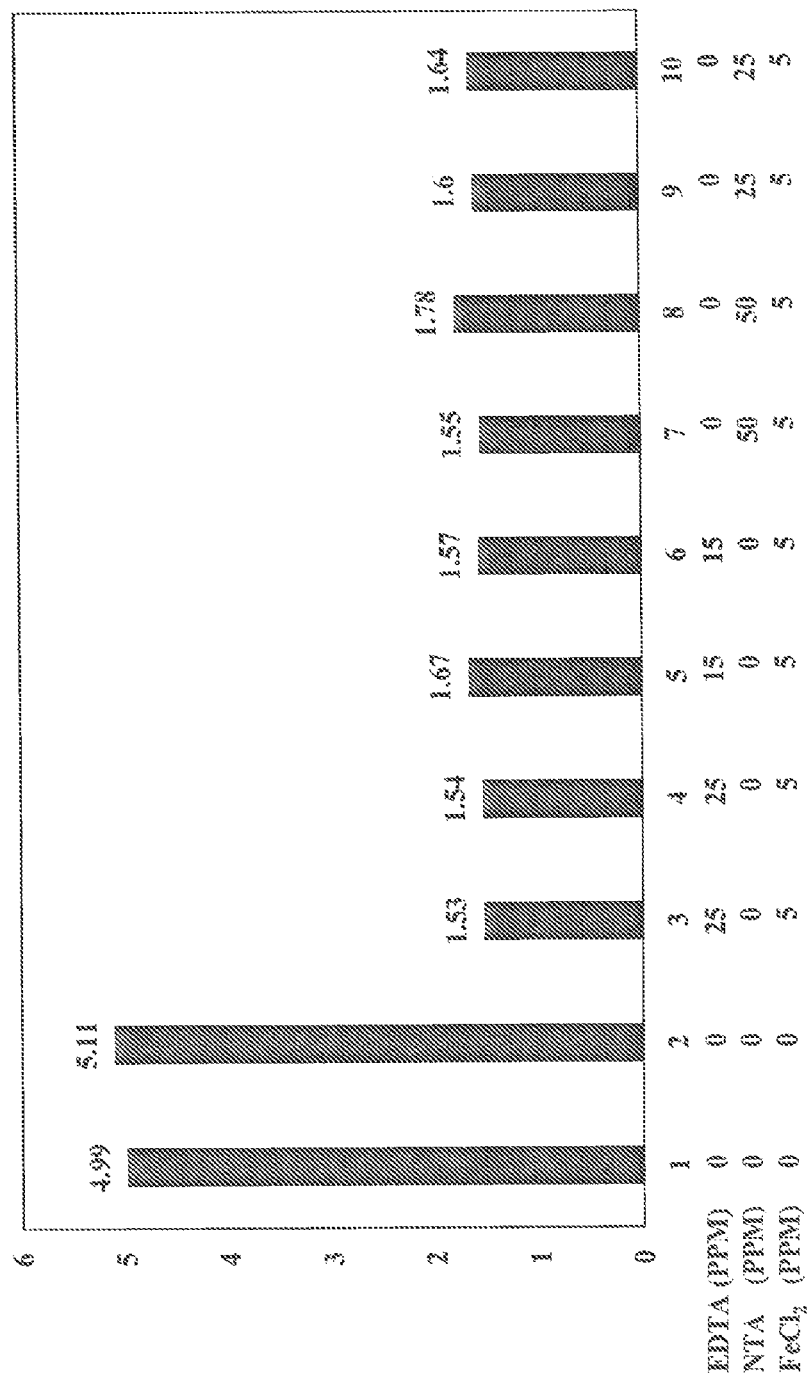
FIG. 5A illustrates viscosity of several simulated produced water samples after an exemplary treatment process in anaerobic conditions with various iron complexes, in accordance with Example 4.

First, the simulated produced water sample was prepared by dissolving 30 g/L NaCl (to make 3% NaCl solution) in hot tap water and then adding 1 g/L of polymer. Then polymer was dissolved by mixing it for 2 hours at 500 rpm. The initial concentration of the polymer in the simulated produced water solution was 1,000 ppm. The polymer solution was transferred to 1 L serum bottles, and it was made anaerobic by bubbling with nitrogen gas overnight. Inside the anaerobic chamber, the anaerobic polymer solution was aliquoted into 1.25 mL serum bottles with 50 mL polymer solution in each bottle. The chemical degradation reaction started by injecting first the chelator EDTA or NTA (as specified), and then injecting ferrous chloride into the samples in the serum bottles at specified concentrations. The serum bottles were then incubated in a shaker/incubator for 2 hours at 40° C. and 250 rpm (FIG. 5A), or for 30 minutes at 40° C.; and 250 rpm (FIG. 5B). Following the incubation, the serum bottles were opened and viscosity and pH of the samples were measured and recorded (see FIG. 5A and FIG. 5B).

Referring to FIG. 5A, for all of the exemplary treatment conditions tested, the viscosity was reduced to less than 2 cP and the pH remained between 6.1-6.2. The highest reduction of polymer viscosity was achieved using 25 ppm of EDTA and 5 ppm of $FeCl_2$. Referring to FIG. 5B, exemplary treatment conditions that were tested also reduced the viscosity of the simulated produced water to less than 2 cP with lower dosages of iron complex (FIG. 5B).

Example 5 Anaerobic Treatment of Polymer Flooding Produced Water

In this example, a simulated produced water sample was treated under anaerobic conditions using exemplary iron complex comprising ferrous chloride and EDTA, For this example, the simulated produced water sample was a salt water solution that included a commercially-available water soluble, high molecular weight partially hydrolyzed anionic polyacrylamide based polymer (Polymer C), which is representative of a polymer used in polymer flooding techniques.

A spinner flask with a water jacket was used for the subsequent experiment in order to follow the chemical degradation reaction over time. In this case, 30 g of NaCl (to make 3% NaCl solution) was dissolved in 1 L of hot tap water, then 1 g of Polymer C was added (to make a polymer solution with 1,000 ppm concentration and initial viscosity: 5.78 cP). Mixing then occurred by magnetic stirring. The temperature was maintained at 40° C. The polymer solution was made anaerobic by bubbling it with nitrogen gas overnight. Subsequently, EDTA was added to obtain an initial concentration of 25 ppm. After 42 minutes of reaction time, ferrous chloride was added to obtain a concentration of 5 ppm. Several samples were analyzed for viscosity during a 2 h reaction time. The solution was left standing and no precipitation was observed after 24 hours.

FIG. 6 presents results related to the anaerobic chemical degradation of Polymer C over time. Almost no degradation was found after the addition of EDTA alone. After the addition of ferrous chloride the viscosity dropped to 2 cP after 2 min. The viscosity remained relatively constant for 2 hours. These results demonstrated the effectiveness of ferrous chloride and EDTA in decreasing the viscosity of the solution by rapidly degrading the polymer. The final viscosity was within target range to facilitate the operation of produced water treatment devices (including oil-water separation step(s)).

Example 6 Biodegradation of Treated Produced Water Samples in Sea Water

In this example, several samples of treated and untreated simulated produced water samples were evaluated for biodegradation in sea water. In this example, a simulated produced water sample was a salt water solution that included a commercially-available water soluble, high molecular weight partially hydrolyzed anionic polyacrylamide (HPAM) based polymer (Polymer C) which is representative of a polymer used in polymer flooding techniques. The treated samples were treated under anaerobic conditions using exemplary iron complex comprising ferrous chloride and EDTA.

The biodegradation test was performed following the OECD guidelines for testing of chemicals, specifically test #306: Biodegradability in Seawater (adopted 17 Jul. 1992), which is hereby incorporated by reference in its entirety. Sea water was collected from the Atlantic Ocean (Hilton Head, S.C.). The water was filtrated to separate large particles. Microbial activity was tested by plating the sea water in marine agar medium and by testing ATP activity. In addition, the salinity, pH, and total organic carbon (TOC) of the water were analyzed (Table 2).

TABLE 2

CHARACTERISTICS OF THE SEA WATER USED FOR BIODEGRADATION TEST

| | |
|---|---|
| Microbial content (plating in marine agar) | $8.8 \times 10^3$ cells/ml |
| Microbial activity (ATP test): | |
| Free ATP | 264 pg/ml |
| Total ATP | 777 pg/ml |
| Salinity | 2.62% |
| pH | 6.9 |
| Total organic carbon (TOC) | 5.169 mg/L |

Simulated produced water samples (and control samples) were prepared as described above in Example 5, using the components described in. Table 3, below. 200 mL of each produced water sample were added to a 1 L Erlenmeyer flask, along with 400 mL of the sea water. In addition, 1 mL from each of the four mineral nutrients stock solutions was added to each of the flasks (details of the solution are provided in the OECD test #306: Biodegradability in Seawater protocol). The flasks were incubated in a shaker, at 100 rpm, at room temperature. Samples for TOC were collected over time and filtrated using a 0.45 μm filter. The calculation of the biodegradation was done using the following equation:

$$D_t = \left[1 - \frac{C_t - C_{bl(t)}}{C_0 - C_{bl(0)}}\right] \times 100$$

Where: $D_t$=degradation in percentage TOC removal at time t, $C_0$=starting concentration of TOC in the test medium, $C_t$=concentration of TOC in the test medium at time t, $C_{bl(0)}$=starting concentration of TOC in the blank, and $C_{bl(t)}$=concentration of TOC in the blank at time t.

TABLE 3

EXPERIMENTAL DESIGN FOR BIODEGRADATION TEST

| Flask # | Carbon source | Sea water |
|---|---|---|
| 1 | 200 mL Polymer C (1000 ppm) in 3% NaCl, viscosity 5.73 cP | 400 ml filtrated sea water |
| 2 | 200 mL Polymer C (1000 ppm) in 3% NaCl, viscosity 5.73 cP | 400 ml filtrated sea water |
| 3 | 200 mL Polymer C (1000 ppm) in 3% NaCl chemically degraded with EDTA (25 ppm) and ferrous chloride (5 ppm), viscosity 1.57 cP | 400 ml filtrated sea water |
| 4 | 200 mL Polymer C (1000 ppm) in 3% NaCl chemically degraded with EDTA (25 ppm) and ferrous chloride (5 ppm), viscosity 1.57 cP | 400 ml filtrated sea water |
| 5 | 200 mL 3% NaCl (blank sample) | 400 ml filtrated sea water |
| 6 | 200 mL 3% NaCl (blank sample) | 400 ml filtrated sea water |

TABLE 4

RESULTS OF BIODEGRADATION TEST

| Incubation of experiment at room temperature (days) | Degradation in percentage of TOC HPAM (not degraded) % (Flasks 1 & 2) | Degradation in percentage of TOC chemically degraded HPAM with EDTA (25 ppm) and ferrous chloride (5 ppm) (Flasks 3 & 4) |
|---|---|---|
| 25 | 0 | 0.26 |
| 28 | 4.16 | 35.68 |
| 33 | 15.24 | 60.25 |
| 36 | 93.65 | 100.52 |

Current OECD standards require more than 20% degradation after 28 days of incubation. The results in Table 4 show that the untreated HPAM samples do not meet this biodegradation standard. In fact, HPAMs are sometimes categorized as "red label chemicals" because they are not readily biodegraded in sea water. In comparison, Table 4 shows that in this biodegradation test after 28 days, the polymer in the treated produced water sample showed 35.7% carbon removal as compared to only about 4.2% carbon removal for the untreated sample. A similar biodegradation difference can be observed at 33 and 36 days.

Example 7 Treatment of Produced Water Samples Under Anaerobic Conditions at Various Temperatures In this example, a simulated produced water sample was treated under anaerobic conditions using exemplary iron complexes comprising ferrous chloride (5 ppm) and EDTA (15 ppm). For this example, the simulated produced water sample was a salt water solution that included a commercially-available water soluble, high molecular weight partially hydrolyzed anionic polyacrylamide based polymer (Polymer C), which is representative of a polymer used in polymer flooding techniques.

First, the simulated produced water sample was prepared by dissolving 30 g/L of NaCl (to make 3% NaCl solution) in hot tap water and then adding 1 g/L of polymer. Then polymer was dissolved by mixing it for 2 hours at 500 rpm. The initial concentration of the polymer in the simulated produced water solution was 1,000 ppm. The polymer solution was transferred to 1 L serum bottles, and it was made anaerobic by bubbling with nitrogen gas overnight. Inside the anaerobic chamber, the anaerobic polymer solution was aliquoted into 125 mL serum bottles with 50 mL polymer solution in each bottle. The chemical degradation reaction started by injecting first the chelator EDTA and then injecting ferrous chloride into the samples in the serum bottles. The serum bottles were then incubated in a shaker/incubator for 30 minutes at 250 rpm at either 40° C., 60° C., or 80° C. Control simulated produced water samples that did not contain the exemplary iron complex were also evaluated at 40° C., 60° C., and 80° C. Following the 30 minute incubation, the serum bottles were opened and the viscosity of the samples was measured and recorded (see FIG. 7).

Referring to FIG. 7, for all of the temperatures tested, the viscosity of the treated produced water samples was reduced to less than 2 cP.

Example 8 Anaerobic Treatment of Polymer Flooding Produced Water With Quenching In this example, a simulated produced water sample was treated under anaerobic conditions using an exemplary iron complex comprising ferrous chloride and EDTA, which was followed by quenching of the polymer degradation with a quenching agent. For this example, the simulated produced water sample was a salt water solution that included a commercially-available water soluble, high molecular weight partially hydrolyzed anionic polyacrylamide based polymer (Polymer C), which is representative of a polymer used in polymer flooding techniques. Additionally, various different quenching agents were evaluated in separate experiments, as described below.

First, the simulated produced water sample was prepared by dissolving 30 g/L of NaCl (to make 3% NaCl solution) in hot tap water and then adding 1 g/L of polymer. Polymer was then dissolved by mixing for 2 hours at 500 rpm. The initial concentration of the polymer in the simulated produced water solution was 1,000 ppm. The polymer solution was transferred to 1 L serum bottles, and it was made anaerobic by bubbling with nitrogen gas overnight. Inside the anaerobic chamber, the anaerobic polymer solution was aliquoted into 25 ml serum bottles with 50 mL polymer solution in each bottle. The chemical degradation reaction started by injecting 15 ppm of ethylenediaminetetraacetic acid (EDTA) and 5 ppm of ferrous chloride into the serum bottles. For instances where quenching occurred, sodium sulfite, sodium thiosulfate, ammonium bisulfite, hydroquinone, or methanol was added at various molar ratios of quenching agent to ferrous chloride concentration (see FIG. 8) before injecting the EDTA and ferrous chloride. The serum bottles were then incubated a shaker/incubator for 30 minutes at 40° C. and 250 rpm. Following incubation, the serum bottles were opened and viscosity and pH were measured. The percentage of the viscosity retained relative to a simulated produced water sample that was not treated with ferrous chloride and EDTA was used to standardize the percentage of viscosity retained by each of the samples treated with quenching agent, and the end point measurements are presented in FIG. 8.

Figure 8:
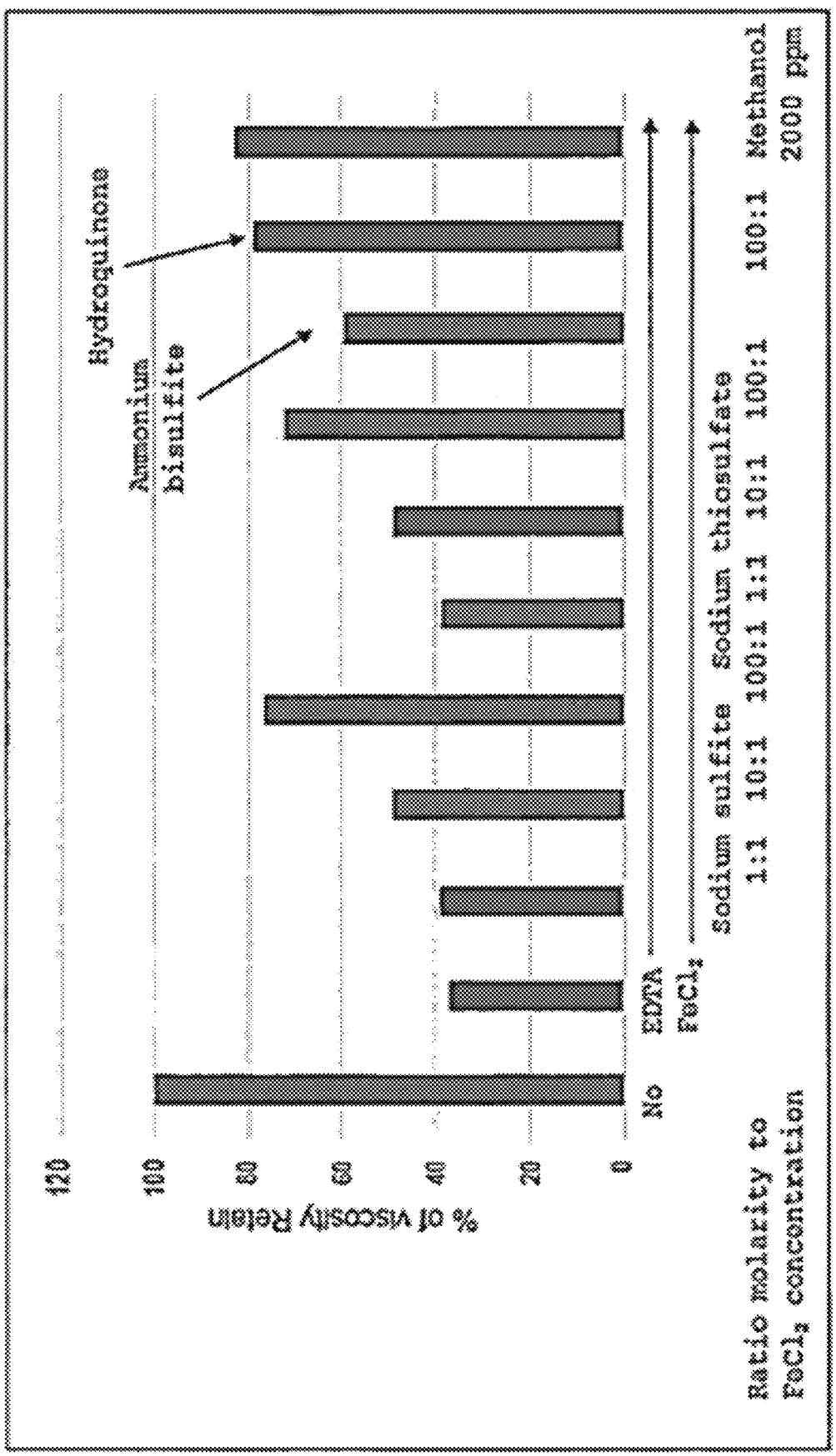
FIG. 8 illustrates the percentage of viscosity retained when an exemplary treatment of a simulated produced water sample in anaerobic conditions with an iron complex was further treated with various exemplary quenching agents, in accordance with Example 8.

Referring to FIG. 8, the results of experiments testing the ability of sodium sulfite, sodium thiosulfate, ammonium bisulfite and hydroquinone to quench the degradation reaction involving Polymer C are presented. Methanol at 2000 ppm was competing as degrading target with the polymer (see FIG. 8). The highest quenching degree of quenching was obtained when using a molar ratio of 100:1 (quenching chemical to ferrous chloride) of either sodium sulfite or hydroquinone (see FIG. 8).

Example 9 Anaerobic Treatment of Polymer Flooding Produced Water With Quenching of Degradation In this example, two simulated produced water samples were treated under anaerobic conditions using an exemplary iron complex comprising ferrous chloride and EDTA, and for one of the two samples, an exemplary quenching agent was added to quench the polymer degradation that occurred as a result of use of the exemplary iron complex. For this example, the simulated produced water samples were a salt water solution that included a commercially-available water soluble, high molecular weight partially hydrolyzed anionic polyacrylamide based polymer (Polymer C), which is representative of a polymer used in polymer flooding techniques. In the present example, the degradation reaction and the quenching reaction were tracked over time.

First, the simulated produced water samples were prepared by dissolving 30 g/L of NaCl (to make 3% NaCl solution) in hot tap water and then adding 1 g/L of polymer. Then polymer was dissolved by mixing for about 2 hours while the temperature was maintained at 40° C. in a water-jacketed vessel. The initial concentration of the polymer in the simulated produced water solutions was 1,000 ppm. The polymer solutions were made anaerobic by bubbling with nitrogen gas overnight and were kept anaerobic with nitrogen gas. Subsequently, EDTA was added to obtain an initial concentration of 50 ppm. 30 minutes after the addition of EDTA, ferrous chloride was added to obtain a concentration of 5 ppm (time=0 min., see FIG. 9 and FIG. 10). 23 hours following the addition of the ferrous chloride the reactor volume had decreased to 750 ml in the case of FIG. 9, and 23 hours following the addition of the ferrous chloride the reactor volume had decreased to 750 ml in the case of FIG. 10. Subsequently 250 ml of anaerobic 4,000 ppm polymer solution (in 3% NaCl) was added see FIG. 9), or, alternatively, sodium sulfite at a concentration of 100 times more molarity as compared to the exemplary iron complex was added to the vessel before adding the 4,000 ppm polymer solution (see FIG. 10). The viscosity and pH of the mixture were monitored for an additional 96 hours, and the results are presented in FIG. 9 and FIG. 10.

Figure 9:
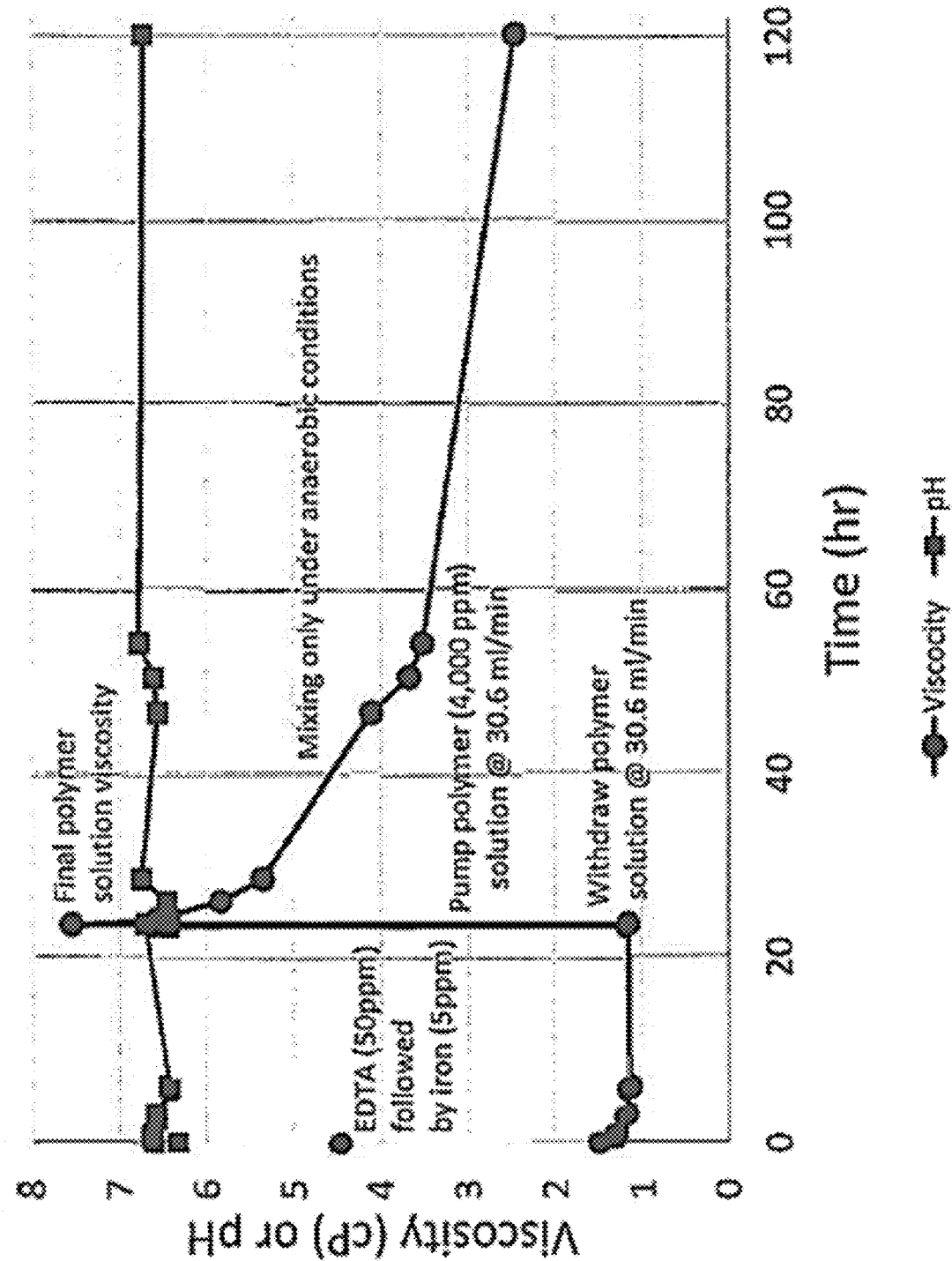
FIG. 9 illustrates the viscosity and pH values over time resulting from an exemplary treatment of a simulated produced water sample in anaerobic conditions with an iron complex, in accordance with Example 9. The black circles in FIG. 9 represent viscosity values, and the black squares in FIG. 9 represent pH values.

FIG. 9 presents the results of the experiment measuring the anaerobic chemical degradation of Polymer C over time, followed by the introduction of additional Polymer C. Polymer C was degraded to less than 2 cP in 2 minutes (see FIG. 9). After the addition of more Polymer C ("fresh polymer" or "new polymer"), the viscosity rose to 7.55 cP. Due to the remaining EDTA and ferrous chloride in the solution as well as the reaction conditions, additional degradation of the polymer was observed over time (see FIG. 9). At time=120 h, the viscosity was 2.46 cP, which translates to a reduction in viscosity of about 67%. The pH varied between 6.3 and 6.7 over the course of the experiment (see FIG. 9).

Figure 10:
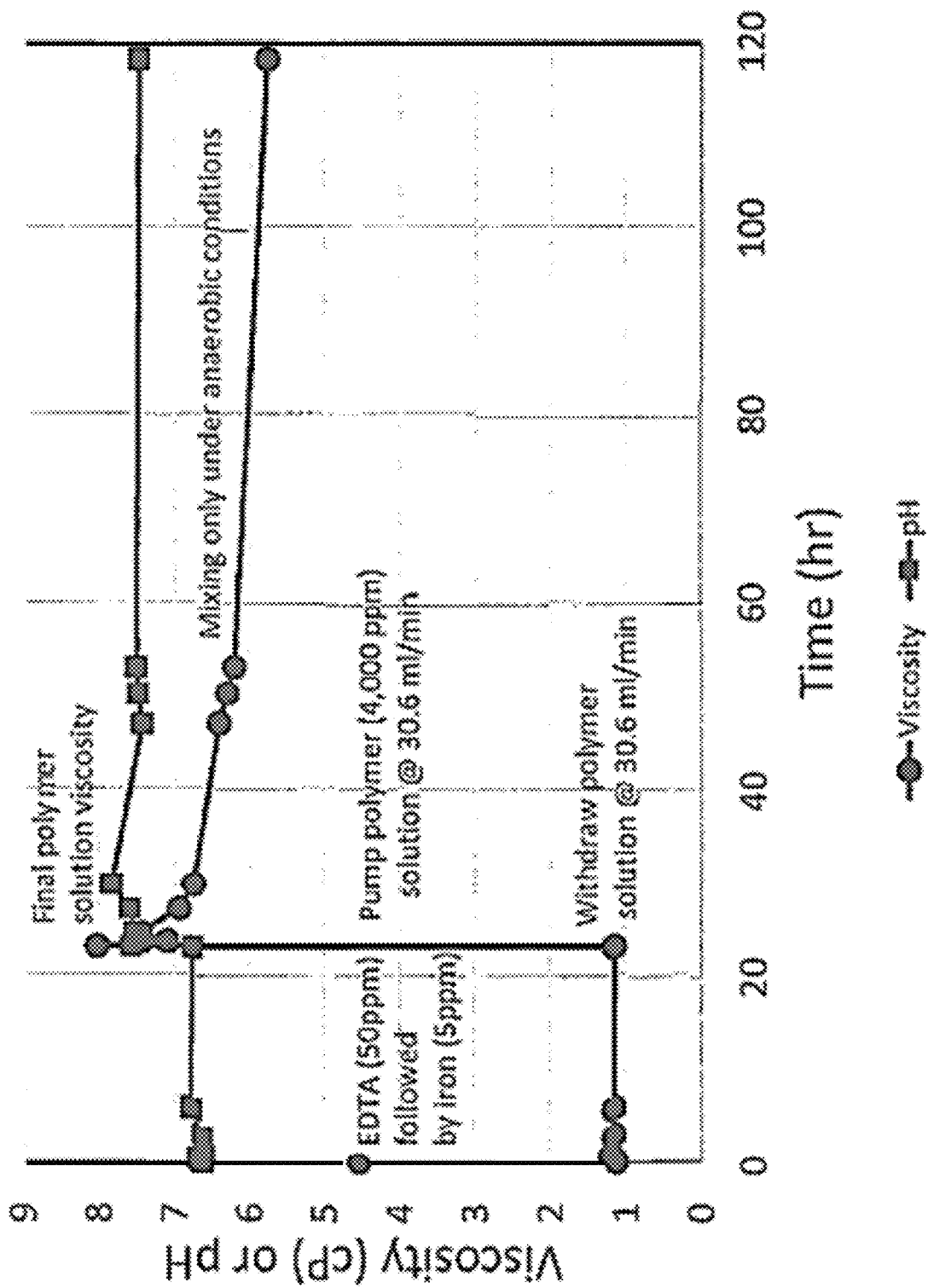
FIG. 10 illustrates the viscosity and pH values over time resulting from an exemplary treatment of a simulated produced water sample in anaerobic conditions with an iron complex which was further treated with an exemplary quenching agent, in accordance with Example 9. The black circles in FIG. 10 represent viscosity values, and the black squares in FIG. 10 represent pH values.

FIG. 10 presents the results of the experiment measuring the anaerobic chemical degradation of Polymer C over time, followed by the introduction of an exemplary quenching agent (sodium sulfite) and additional Polymer C, which was added to protect the new Polymer C from degradation. The polymer was degraded to less than 2 GP in 2 minutes (see FIG. 10). After addition of more Polymer C, the viscosity rose to 8.04 cP (see FIG. 10), and the viscosity was 5.77 cP after 120 h, representing an overall reduction in viscosity of 28%. By comparison, the viscosity was reduced by 67% without addition of a quenching agent (see FIG. 9), and the viscosity was reduced by 16% in the case of a control experiment (see below and FIG. 11). The low overall reduction in viscosity over the course of the 120 h experiment in the case of FIG. 10 demonstrated the effectiveness of the exemplary quenching agent sodium sulfite in quenching of the degradation of Polymer C by an exemplary iron complex. The pH value was about 6.6 at the beginning of the experiment, and the pH value rose to about 7.5 after the addition of sodium sulfite.

Figure 11:
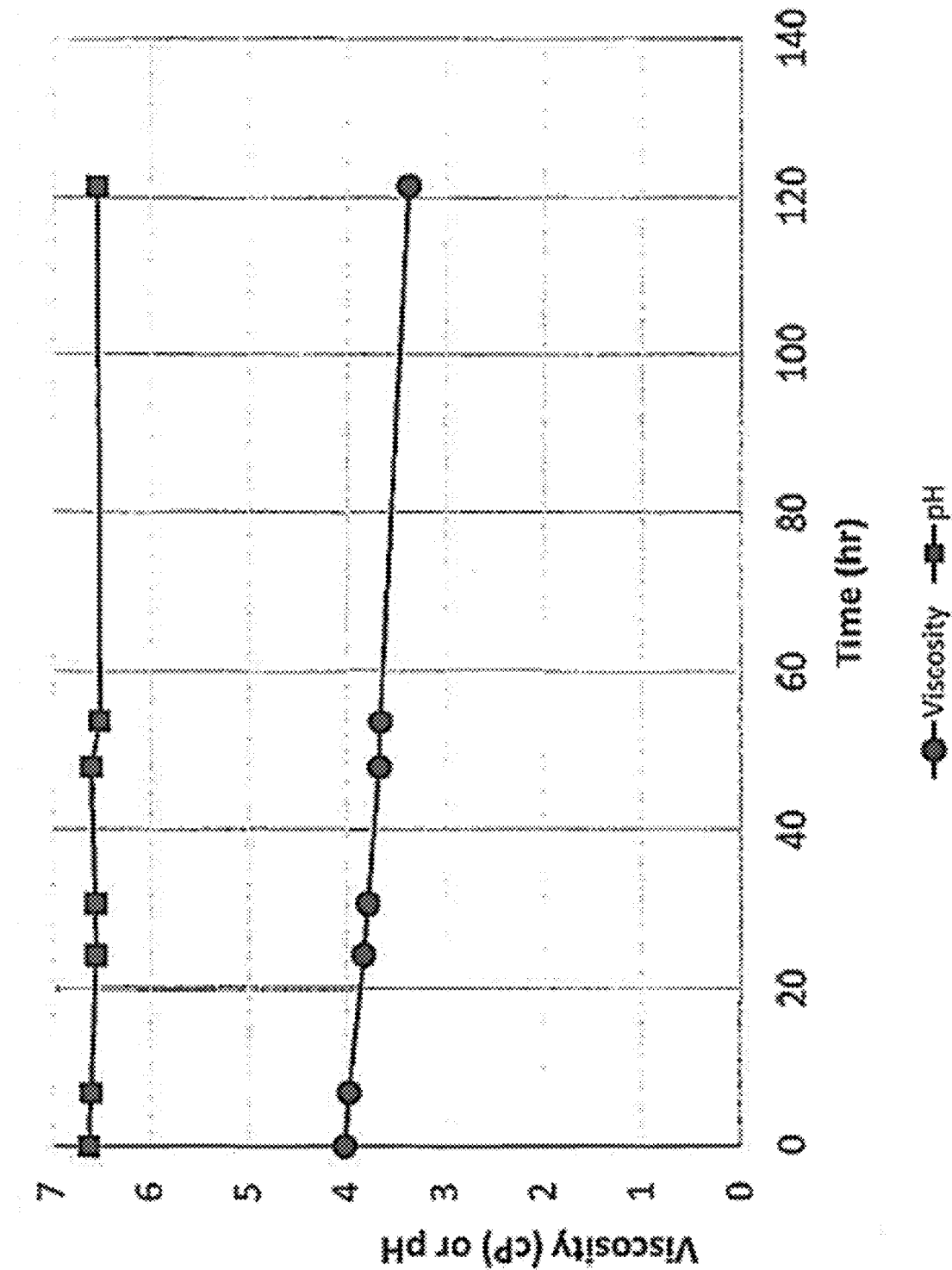
FIG. 11 illustrates the viscosity and pH values over time of a simulated produced water sample in anaerobic conditions without treatment, i.e., without addition of iron complex or quenching agent, in accordance with Example 9. The black circles in FIG. 11 represent viscosity values, and the black squares in FIG. 11 represent pH values.

A control experiment was performed to evaluate the stability of Polymer C under the conditions used to obtain the data presented in FIG. 9 and FIG. 10 (see FIG. 11). As in FIG. 9 and FIG. 10, viscosity and pH were measured at specific time points over the course of 120 h (see FIG. 11). The viscosity at time=0 was 4.02 cP, and the viscosity at time=120 h was 3.37 cP representing an overall reduction in viscosity of 16% reduction. The pH remained at 6.5 throughout the time course of the control experiment.

In the preceding procedures, various steps have been described. It will, however, be evident that various modifications and changes may be made thereto, and additional procedures may be implemented, without departing from the broader scope of the exemplary procedures as set forth in the claims that follow.

The invention claimed is:

1. A composition for use in treating produced water comprising one or more water soluble polymers, and comprising: one or more quenching agents; wherein said composition comprises
   (a) one or more iron complexes comprising an iron compound and a complexing agent, wherein said iron compound comprises iron sulfate, ferrous sulfate heptahydrate, or iron (II) chloride and said complexing agent comprises citric acid, ethylenediaminetetraacetic acid (EDTA), or nitrilotriacetic acid (NTA), sodium acetate, lactic acid, L-glutamic acid, glycolic acid, sodium polyacrylate, pentetic acid (DTPA), or sodium tripolyphosphate (STPP); and
   (b) one or more water soluble polymers.

2. The composition of claim 1, wherein said at least one iron complex comprises: iron sulfate and citric acid; ferrous sulfate heptahydrate and citric acid; iron (II) chloride and ethylenediaminetetraacetic acid (EDTA); or iron (II) chloride and nitrilotriacetic acid (NTA).

3. The composition of claim 1, wherein the ratio of iron to complexing agent is from about 100:1 to about 1:5.

4. The composition of claim 1, wherein said quenching agent comprises sodium sulfite, sodium thiosulfate, ammonium bisulfate, hydroquinone, or a combination or mixture thereof.

5. The composition of claim 1, wherein the molar ratio of said quenching agent to said iron complex is from about 1:1 to about 500:1.

6. The composition of claim 1 wherein:
   (a) said one or more water soluble polymers comprise at least one acrylamide (co)polymer;
   (b) said iron compound comprises iron sulfate, ferrous sulfate heptahydrate, or iron (II) chloride; and
   (c) said complexing agent comprises citric acid, ethylenediaminetetraacetic acid (EDTA), or nitrilotriacetic acid (NTA).

7. The composition of claim 6 wherein said at least one iron complex comprises: iron sulfate and citric acid; ferrous sulfate heptahydrate and citric acid; iron (II) chloride and ethylenediaminetetraacetic acid (EDTA); or iron (II) chloride and nitrilotriacetic acid (NTA).

8. The composition of claim 6 wherein the ratio of iron to complexing agent is from about 100:1 to about 1:5.

9. A produced water comprising one or more water soluble polymers treated with a composition according to claim 1, optionally wherein the produced water was generated during any part of an enhanced oil recovery process or polymer flooding process.

10. The treated produced water of claim 9, wherein:
    i. the treated produced water has a viscosity of less than about 2.5 cP;
    ii. the treated produced water has a viscosity that is at least about 64% less than the viscosity of the untreated produced water;
    iii. the treated produced water has a viscosity that is at least about 3 cP less than the viscosity of the untreated produced water; or
    iv. the treated produced water has reduced viscosity compared to untreated produced water.

11. The treated produced water of claim 9, wherein:
    i. said at least one iron complex comprises: iron sulfate and citric acid; ferrous sulfate heptahydrate and citric acid; iron (II) chloride and ethylenediaminetetraacetic acid (EDTA); or iron (II) chloride and nitrilotriacetic acid (NTA);
    ii. the ratio of iron to complexing agent is from about 100:1 to about 1:5;
    iii. the addition of said at least one iron complex provides an iron concentration of 10,000 ppm or less in the treated produced water;
    iv. the treated produced water has a pH that is equal to or less than the pH of the untreated produced water; and
    v. the treatment results in the degradation of said one or more water soluble polymers comprised in the produced water.

* * * * *